(12) United States Patent
Mercer et al.

(10) Patent No.: US 7,896,598 B2
(45) Date of Patent: *Mar. 1, 2011

(54) LOW SWAGE LOAD FASTENING SYSTEM AND METHOD

(75) Inventors: Larry D. Mercer, Waco, TX (US); Robert J. Corbett, Waco, TX (US)

(73) Assignee: Huck International, Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/823,310

(22) Filed: Jun. 25, 2010

(65) Prior Publication Data

US 2010/0266363 A1      Oct. 21, 2010

Related U.S. Application Data

(63) Continuation of application No. 11/592,661, filed on Nov. 3, 2006.

(51) Int. Cl.
*F16B 19/00*      (2006.01)

(52) U.S. Cl. ........................... 411/361; 411/43

(58) Field of Classification Search .................. 411/361, 411/70, 509, 970, 999; 29/243.519
See application file for complete search history.

(56) References Cited

U.S. PATENT DOCUMENTS

| 2,531,048 | A | 11/1950 | Huck |
|---|---|---|---|
| 2,531,049 | A | 11/1950 | Huck |
| 2,764,045 | A | 9/1956 | Koenig |
| 3,029,665 | A | 4/1962 | Baugh et al. |
| 3,215,024 | A | 11/1965 | Brilmyer at al. |
| 3,915,053 | A | 10/1975 | Ruhl |
| 4,299,519 | A | 11/1981 | Corbett |
| 4,472,096 | A | 9/1984 | Ruhl et al. |
| 4,531,871 | A | 7/1985 | Sigmund |
| 4,597,263 | A | 7/1986 | Corbett |
| 4,813,834 | A | 3/1989 | Smith |

(Continued)

FOREIGN PATENT DOCUMENTS

SU          1097837 A        5/1982

OTHER PUBLICATIONS

International Search Report and Written Opinion issued in connection with applicants' International Patent Application No. PCT/US06/43232 entitled "Low Swage Load Fastening System and Method" (10 pages).

*Primary Examiner* — Gary Estremsky
(74) *Attorney, Agent, or Firm* — Greenberg Traurig, LLP

(57) ABSTRACT

A swage-type fastener to secure a plurality of workpieces together, which includes a pin member, having an elongated pin shank to be located in aligned openings in the workpieces. An enlarged head at one end of the pin engages one side of the workpieces. A grooved pin portion extends past an opposite side of the workpieces. A collar includes a shank portion adapted to be swaged into the pin lock grooves in response to a relative axial swage load applied by an installation tool. The collar is as-headed and does not require thermal processing yet provides an optimum balance of reduced collar shank wall thickness and increased hardness, whereby the swage load is minimized. A low swage load thread form for the lock grooves of the pin member is also provided, a reduced diameter, and a relatively short pull portion pin extension.

16 Claims, 9 Drawing Sheets

U.S. PATENT DOCUMENTS

| | | |
|---|---|---|
| 4,867,625 A | 9/1989 | Dixon |
| 4,878,372 A | 11/1989 | Port et al. |
| 4,921,384 A | 5/1990 | Nordyke |
| 4,943,196 A | 7/1990 | Dahl |
| 5,049,016 A | 9/1991 | Nordyke |
| 5,090,852 A | 2/1992 | Dixon |
| 5,125,778 A | 6/1992 | Sadri |
| 5,315,755 A | 5/1994 | Fulbright et al. |
| 5,548,889 A | 8/1996 | Smith et al. |
| 5,604,968 A | 2/1997 | Fulbright et al. |
| 6,233,802 B1 | 5/2001 | Fulbright |
| 6,325,582 B1 | 12/2001 | Sadri et al. |
| 6,497,024 B2 * | 12/2002 | Fulbright .............. 29/243.522 |
| 6,702,684 B2 | 3/2004 | Harbin et al. |
| 7,195,438 B2 | 3/2007 | Harbin et al. |
| 7,293,339 B2 | 11/2007 | Mercer et al. |

* cited by examiner

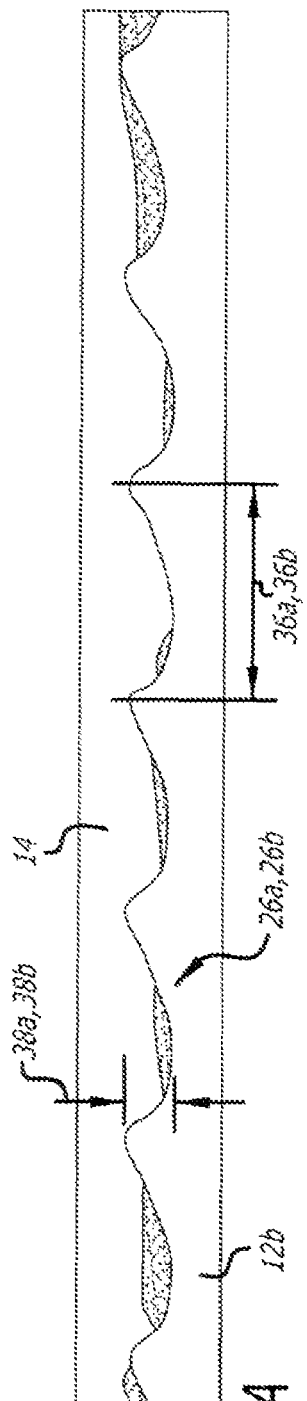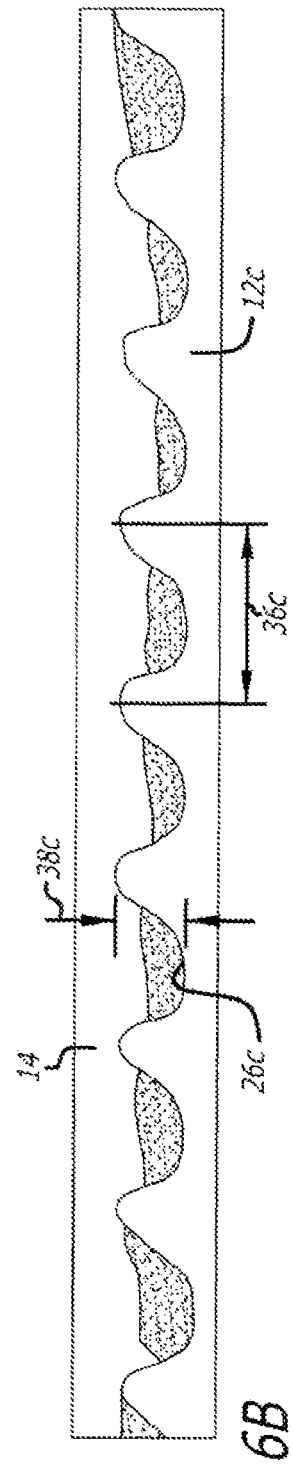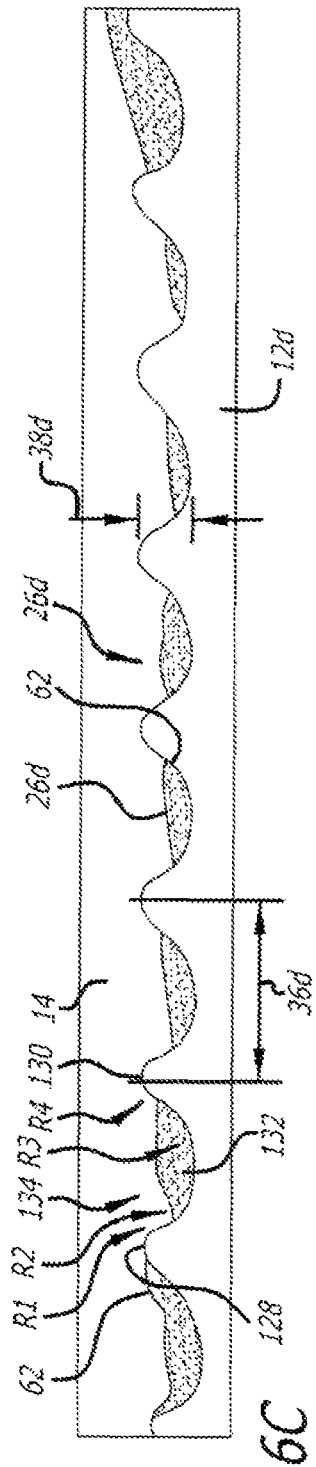

LOW SWAGE LOAD FASTENING SYSTEM AND METHOD

CROSS REFERENCE TO RELATED APPLICATIONS

The present application is a continuation application of prior U.S. application Ser. No. 11/592,661. filed on Nov. 3, 2006, the disclosure of which is incorporated by reference herein in its entirety.

BACKGROUND

1. Field

The present invention relates to fasteners and, more specifically, to a fastening system including a multi-piece, swage-type fastener and a swage tool therefore, which exhibit an optimum balance of low swage load and high strength. The invention also relates to a simplified installation method using a low swage load fastening system.

2. Related Art

In many commercial applications, two-piece threaded or swaged fasteners, commonly referred to as lockbolts, are commonly used to secure a number of workpieces together. See, e.g. U.S. Pat. Nos. 2,531,048; 3,215,024; 3,915,053; 4,472,096; and 5,090,852. The material properties (e.g., without limitation, tensile strength and hardness) of these fasteners varies depending on the commercial application in which the fasteners will be used. To distinguish the varying properties of fasteners, the fasteners are typically designated by Grade. The Grade of a fastener is indicative of its strength. Industry standards establish the requisite strength of a fastener in order to meet a particular Grade, with the strength of a particular fastener being determined by the strength of the material of the fastener bolt or pin. For example, a ½ inch Grade 5 fastener has a ½ inch diameter pin or bolt shank portion for use in a nominal ½ inch diameter workpiece opening and, in accordance with SAE J429, Grade 5 or ASTM A-325, such Grade 5 fastener must have a minimum tensile strength of 120 KSI. By way of comparison, in order to qualify as a Grade 8 fastener, per SAE J429, Grade 8 or ASTM A-490, the fastener must have a minimum tensile strength of 150 KSI. Grade 5 fasteners are often used, for example, in railroad (e.g., railcar) applications. Grade 8 fasteners are commonly employed in commercial transportation applications, for example, to secure truck components within the commercial trucking industry.

Typically swage-type fasteners include a pin and a collar. Most of these fasteners are of the pull-type variety and include a pin shank with a locking portion having lock grooves and a pull portion having pull grooves. The pull grooves are adapted to be gripped by matching teeth in chuck jaws of an installation tool with a swage anvil. The swage anvil is adapted to engage the collar and apply a relative axial force between the pin and collar, and to move over the collar and swage it into the lock grooves. The relative axial force comprises a combination of the tensile load on the pin caused by the chuck jaws and the compressive load on the collar caused by the swage anvil. The pull portion of many swage-type fasteners is connected to the lock groove portion by a breakneck groove of reduced strength. The breakneck groove is adapted to fracture at a preselected magnitude of axial or tensile force which is greater than that required to swage the collar. Accordingly, the pull portion, or pintail, will be severed and removed from the pin shank after completion of swaging. Other swage fasteners, however, have pull portions which remain on the pin after completion of installation. See, e.g., U.S. Pat. Nos. 5,315,755, 5,548,889 and 5,604,968 (disclosing a threaded pull portion which is not severed from the pin). In other words, these fasteners are pintail-less. See, e.g., FIGS. 1-8 of the '755 patent.

Among the problems frequently encountered with swage-type fasteners of relatively high strength (e.g., Grade 5 and above), is the excessive magnitude of applied tensile load required in order to fully swage the collar. This results in premature wear of the installation tool, particularly the pulling mechanism, and also stripping of the pull grooves on the pin. The high swage load also complicates the installation process in general, especially where manually operated installation tools are used. In an attempt to overcome some of these disadvantages, a variety of different installation tool modifications have been made. For example, U.S. Pat. No. 4,299,519, which is hereby incorporated herein by reference as if fully set forth herein, discloses an acorn-shaped pin pull portion and complimentary shaped tool gripping structure which are intended to provide engagement of all of the pull grooves of the pull portion by the gripping structure of the tool and, thereby resist stripping of the pull grooves. See, e.g., FIGS. 1-5 of the '519 patent. Other tools merely incorporate hydraulic and/or pneumatic piston-cylinders, in order to assist in applying the necessary swaging force. See, e.g., U.S. Pat. Nos. 4,597,2613 and 4,878,372. However, this adds size and weight to the tool, which can make it awkward to handle or limit accessibility thereby potentially jeopardizing its precise application to drive the fastener and thus the quality of the final installation. Accordingly, there is room for improvement of the installation tool and method for swage-type fastening systems.

The high swage load is largely the result of the use of fastener collars which have an increased wall thickness and are thus structured to overfill or overpack the lock grooves in order to achieve the requisite strength. for a particular fastener Grade (e.g., Grade 5 and Grade 8). See, e.g., U.S. Pat. No. 5,090,852, supra, (disclosing a modified pin thread form to include shallow grooves and a streamlined root contour, with the collar having an increased wall thickness with sufficient material to overpack such shallow grooves, in order to achieve the requisite shear strength); see also the '755 patent, supra, and U.S. Pat. Nos. 5,548,889 and 5,604,968 (disclosing a shallow pin groove construction and a collar shank with a volume having an excess of material of at least 16% in order to overpack the grooves). Overpacking of the lock grooves is problematic. It is a primary source of the aforementioned undesirable excessively high swage load. Accordingly, several attempts have been made, through variations in swage-type fastener design, to combat these disadvantages and, in particular, the prohibitively high swage load.

For example, U.S. Pat. Nos. 6,233,802 and 6,497,024, which are hereby incorporated herein by reference as if fully set forth herein, disclose a fastening system for a two-piece, swage-type fastener having a wide, shallow lock groove thread form which is designed to permit the fastener to be installed at a lower swage load than a conventional swage-type fastener of comparable Grade yet retain essentially the same physical properties (e.g., tensile strength; clamp load) when installed. The lower swage load permits the advantageous use of a smaller, lighter weight installation tool. The system is described as applied to fasteners having pintails as well as pintail-less fasteners. For pull-type swage fasteners having threaded pull portions which are not severed, as in the '755 patent, supra, the invention is stated to facilitate the engagement of fewer threads on the pull portion because the extra force required to fracture a breakneck, is not required. This is said to (1) result in less stress on the engaged threads of the mating threaded thimble or nut member of the pull tool, thereby extending tool life; (2) permit the use of a shorter, less expensive pin because less pin protrusion is required in order to grip the reduced number of pull grooves which must be gripped; and (3) permit the installation tool to be smaller and thus lighter and less expensive, because lower applied loads are required for final installation. The system also facilitates the use of an internal drive. See, e.g., FIGS. 17 and 18 of the '755 patent (illustrating an internal drive including a threaded pull rod or spindle engageable within the pull grooves of a threaded bore in the end of the pin shank). As described in the '755 patent and U.S. Pat. Nos. 5,548,889 and 5,604,968, which are hereby incorporated herein by reference as if fully set forth herein, use of such internal drive allows for a reduction in protrusion relative to the external drive which, in turn, provides for a more efficient final fit and appearance of the fastener.

However, as disclosed in the '024 patent, supra, in order to achieve the foregoing benefits, it was necessary to change the thread form (e.g., lock groove structure) to a wider and shallower configuration. Although revising the thread form is a viable option to reduce swage load, the thread forth disclosed in the '024 patent is a drastic change requiring significantly larger pitch and a plurality of different radii with a relatively abrupt and discontinuous transition among the radii (e.g. from one radius to another). Producing pins with the disclosed thread form is, therefore, difficult and cost intensive. Additionally, the discontinuous transition among radii of the thread form prevents maximizing the complimentary engagement of the thread form by the collar grooves, when the fastener is swaged. There, therefore, is also room for further improvement in the thread form for pin lock grooves.

Additionally, collars of the type disclosed in the '802 and '024 patents have a very narrow range of acceptable hardness, because too much hardness results in a prohibitively high swage load and too little hardness has insufficient strength. This is particularly problematic with respect to higher Grade fasteners (e.g., Grade 5 and above) with which an increase in hardness of both the bolt and collar is required in order to meet industry tensile strength requirements. Accordingly, known collars must be subjected to a thermal process in order to be soft enough to swage and be compatible with the revised thread form, but strong enough to meet industry Grade standards. This adds still further cost and complexity to the manufacture of the fastener. For example, two such thermal processing methods include stress relieving and quench and tempering; obtaining consistent desired hardness by stress relieving is very difficult to accomplish and quench and tempering is expensive and difficult to accomplish without undesirably carburizing or decarburizing the surface of the collars. Both methods are time and cost intensive, requiring, for example, the added expense of furnace operating costs.

It is, therefore, highly desirable to provide a high-strength, low swage load fastening system which exhibits, among other attributes, all of the benefits of the low swage fasteners disclosed in the '519, '755, '802, and '024 patents, supra, but which, also does not require, for example, cost and time intensive thermal processing of the collar.

There is, therefore, room for improvement in the art of high-strength, low swage load fastening systems.

SUMMARY

It is an object of the present invention to provide a swage-type fastener that exhibits an optimum balance of reduced swage load and high strength.

It is another object of the present invention to provide a fastener that employs an as-headed collar, which does not need to be thermally processed (e.g., quench and tempered; stress relieved).

It is another object of the present invention to provide a high-strength collar with a reduced wall thickness, thereby reducing weight and the swage load, accordingly, while maintaining strength.

It is a further object of the present invention to provide an as-headed collar having sufficient physical properties (e.g., hardness; strength), in order to meet a desired fastener Grade (e.g., Grade 5; Grade 8).

It is another object of the invention to provide a collar which may be employed with existing fasteners and thread forms thereof, while exhibiting the requisite strength of the desired Grade (e.g., without limitation, Grade 5; Grade 8).

It is another object of the present invention to reduce the swage load necessary to set the fastener, thereby decreasing wear of installation tool components (e.g., without limitation, the swage anvil; thimbles; half shells) and increasing tool life.

It is yet another object of the present invention to provide a fastener which eliminates expensive thermal processing steps (e.g., stress relieving; quench and tempering) of the fastener collar.

It is still another object of the present invention to provide a collar which is employable with a wide variety of swage-type fasteners expressly including, but not limited to fasteners with a pintail and pintail-less fasteners, such fasteners being new or part of an existing inventory with which the collar is retrofittable.

It is another object of the present invention to increase the collar hardness in order to maintain or improve the collar strength level, but decrease the swage load by not overpacking the lock grooves of the fastener pin.

It is a further object of the invention to provide an improved fastener lock groove thread form designed to overcome disadvantages experienced by known shallow or waveform thread forms.

It is another object of the invention to provide a lock groove thread form which is structured to reduce swage load, while being relatively easy and thus economical to make.

It is yet another object of the invention to provide a complimentary pull groove and tool gripping structure configuration which provides, among other benefits, one or more of the advantages of improving engagement between the pull grooves and gripping structure, extending fatigue life of the gripping structure (e.g., thimble) by, for example, decreasing the diameter of the pin pulling section and increasing the thimble cross-section and thus the thickness and strength of the pulling threads, and minimal protrusion length of the pull portion of the pin.

Therefore, it is a general object of the present invention to provide an improved, high-strength, swage type fastener and as-headed collar therefor, which can be installed at a reduced swage load with existing tooling and which exhibit optimum material properties (e.g., hardness; strength) of the desired fastener Grade, and to provide a low swage load fastening system comprising one or more of, the as-headed collar, an improved pin pull portion and installation tool configuration, and a superior fastener thread form.

These objects, and others, are met by the present invention which provides a low swage load fastening system and method.

In one embodiment of the invention, the fastener of the system may include a collar having increased hardness and a reduced collar wall thickness adapted to avoid overpacking the lock grooves. The collar is very economical to produce and easier to swage when compared with known fasteners of comparable Grade. This is because the collar of the present invention is employed as-headed, thereby eliminating the costly requirement of a thermal treatment (e.g., quench and tempering; stress relieving). The collar also does not require modification to the pin lock groove thread form. It is, therefore, readily employable with existing pins and installation tools having a variety of different lock groove thread loans, and its reduced swage load, which is attributable to its thin wall, extends installation tool life and/or allows lighter weight tooling. The fastener and collar therefor of the present invention, exhibit all of the foregoing advantages while further providing the surprising and unexpected high-strength capability sufficient to meet Grade 5 and Grade 8 industry fastener standards.

Accordingly, the low swage load fastening system is for a swage-type fastener structured to secure a plurality of workpieces together. The swage-type fastener includes a pin member having an elongated pin shank adapted to be located in aligned openings in the workpieces. The pin member terminates at one end in an enlarged head adapted to engage a surface on one side of the workpieces and at its opposite end in a grooved portion adapted to extend past an opposite surface on the opposite side of the workpieces. The grooved portion of the pin comprises a locking portion having a plurality of lock grooves defined by circumferentially extending pin grooves and associated pin shoulders terminating in pin crests.

The fastener may be selected from the group consisting of pintail fasteners and pintail-less fasteners. The grooved portion of the pin of the fastener may be pintail-less and include an internal threaded bore wherein the installation tool includes an internal drive structured to threadingly engage the internal bore during swaging of the fastener.

In another embodiment of the invention, the low swage load fastening system includes a pin having a substantially straight pull portion extending from the second end of the pin and including a plurality of pull grooves. The pull portion has an outer diameter which is smaller than the outer diameter of the locking portion of the pin. An associated installation tool has a collet with a pull section for complimentarily engaging the pull grooves of the pull portion. The protrusion length of pull portion from the end of the pin is relatively short. Therefore, the pull portion may remain on the pin after swaging or may be removed by shaving it off or fracture of a breakneck groove that is optionally provided on the pin. The reduced diameter of the pull portion permits the installation tools to be thicker and stronger. The straight nature of the pull portion provides superior engagement by the installation tool.

The first tooth of the pull section of the installation tool may have a greater diameter than the remainder of the teeth of the tool, which extends the tool life. The tool may be further improved, and the swage load further reduced, by including a relatively small swage load.

In yet another embodiment of the low swage load fastening system, the fastener pin may include a thread form defined by a number of blended radii having a substantially smooth transition between each radius of the grooves of the thread form. Thereby improving engagement of the grooves by the collar, when it is swaged. Such a thread form eliminates complexities in the thread rolling dies used to roll the threads.

In another aspect of the disclosure there is a low swage load fastening system for a swage-type fastener structured to secure a plurality of workpieces together. The swage-type fastener includes a pin member having an elongated pin shank adapted to be located in aligned openings in the workpieces. The pin member terminates at one end in an enlarged head adapted to engage a surface on one side of the workpieces and at its opposite end in a grooved portion adapted to extend past an opposite surface on the opposite side of the workpieces.

The grooved portion comprises a locking portion having a plurality of lock grooves defined by circumferentially extending pin grooves and associated pin shoulders terminating in pin crests.

An installation tool includes an anvil member with a swage cavity. There is an as-headed collar including a generally straight collar shank adapted to be swaged into said lock grooves on said pin member in response to a relative axial force or swage load applied between said pin member and said as-headed collar by said installation tool.

A desired magnitude of clamp load on the workpieces which are fastened together define a fastened joint. The swage cavity of said installation tool is structured to engage said collar shank and to swage it radially inward. The as-headed collar when swaged, has collar grooves and shoulders interlocking said pin grooves and shoulders. The pin member and said as-headed collar is of different materials having ultimate shear stresses of different magnitudes in order that yielding of said pin member is substantially avoided upon swaging said collar to said pin member, The collet has a protrusion from said collet thereby extending the length of the pull section in a direction towards the collar thereby to increase the contact area With said anvil.

The as-headed collar does not require thermal processing, and the generally straight collar shank of said as-headed collar has a wall thickness which is relatively thin thereby reducing the swage load required to said as-headed collar.

The protrusion forms a flat circular face ahead of and adjacent to the leading thread of the collet, and then a circular forwardly angled face ahead of the flat face, and a second flat face, and an angular flat face back tow a line of intersection with the outer diameter of the collet.

The end of the pull is not rolled down to a diameter position in line with the base of the groove thereby to increase the shear strength of the end pull crest of the pull.

In yet a different aspect the last pull crest of the pull have a contour to conform with an enlarged puller radius of the last tooth of the collet.

All of the foregoing low swage load mechanisms may be employed individually or in any suitable combination. A swage-type fastener, and a method of securing a plurality of work pieces together using the aforementioned low swage load system, are also disclosed.

DRAWINGS

A full understanding of the invention can be gained from the following description of the preferred embodiments when read in conjunction with the accompanying drawings in which:

FIGS. 6A, 6B and 6C are cross-sectional specimen views of swaged fasteners having waveform, deep, and hybrid lock groove thread forms, respectively;

Figure 10:
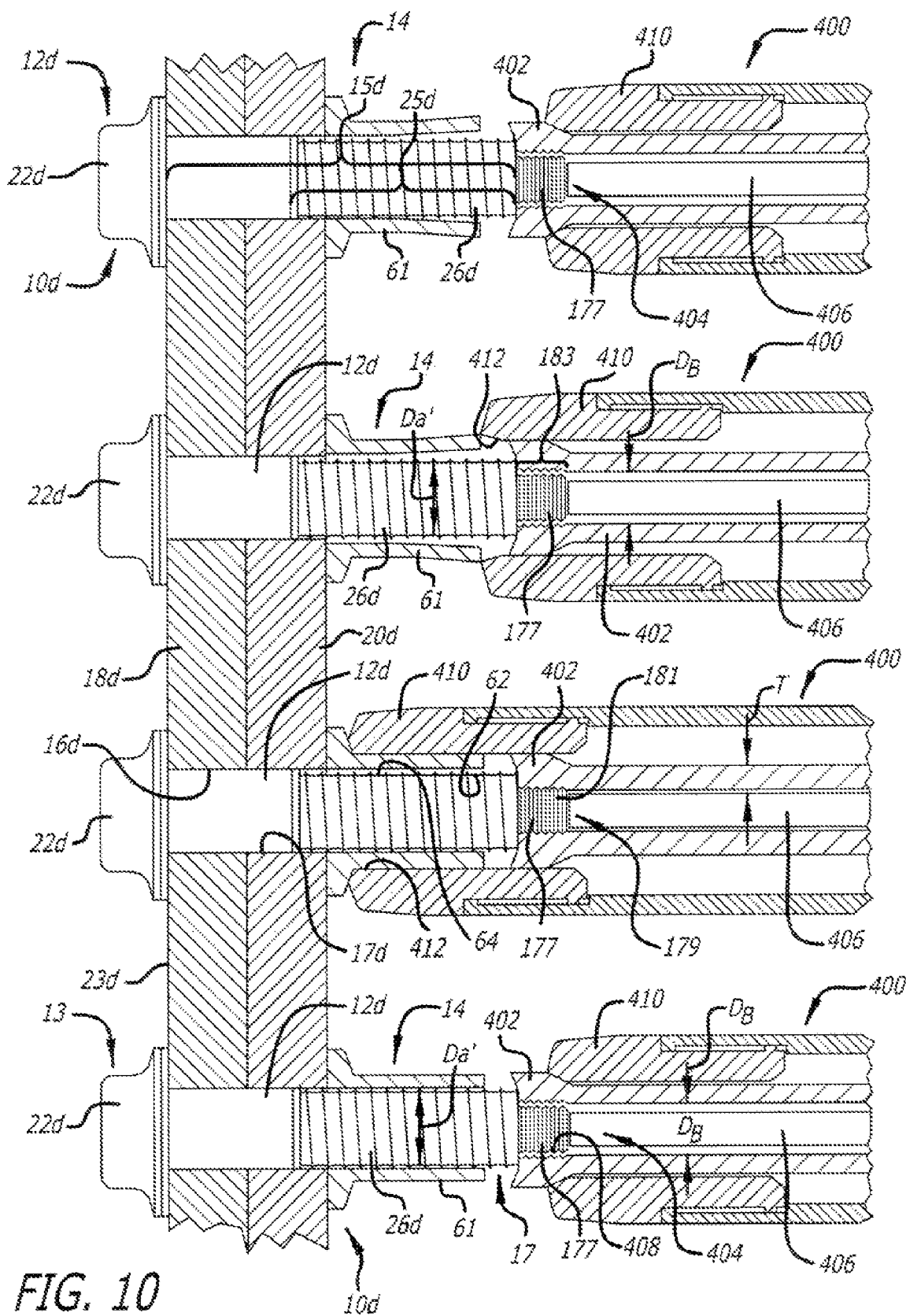
Figure 11:
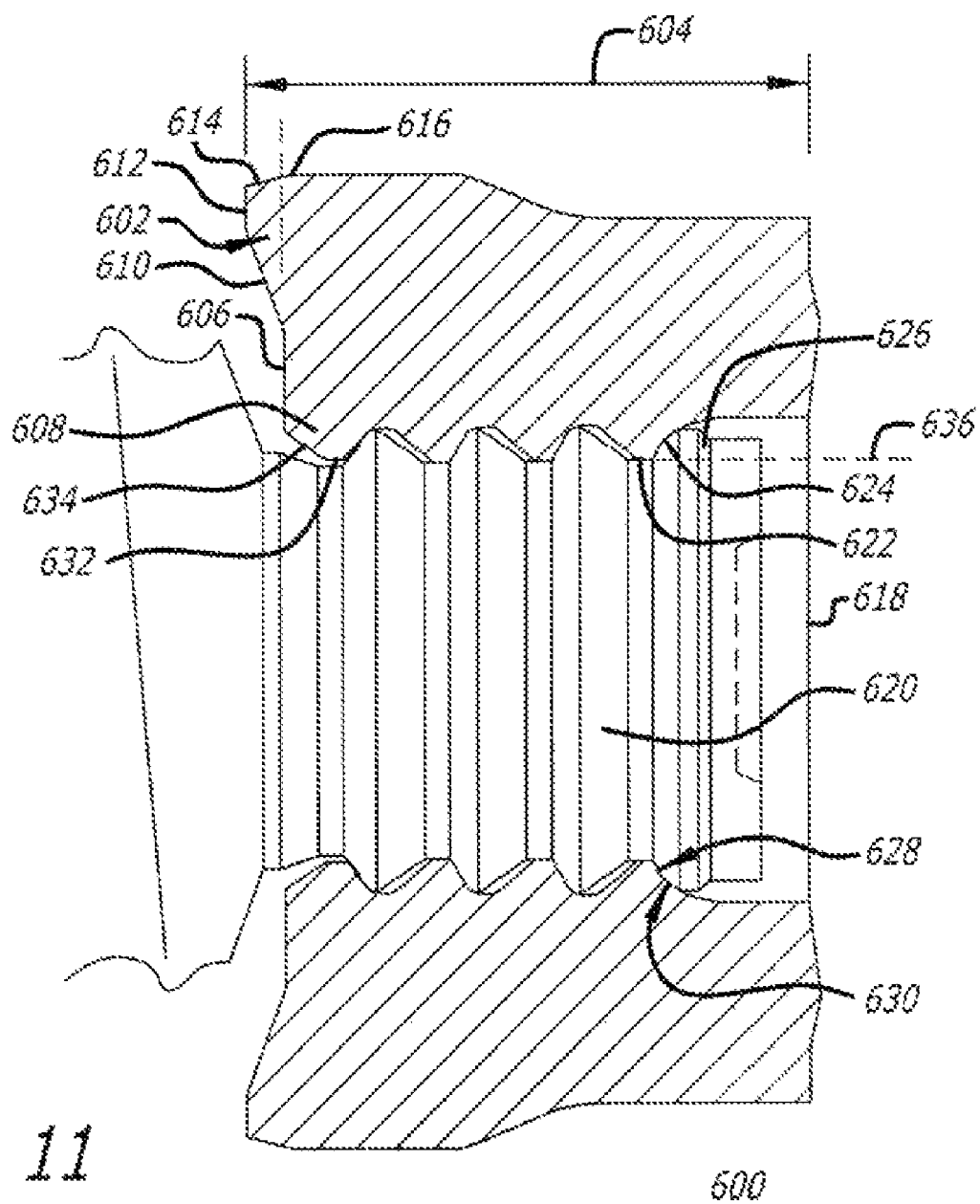

FIG. 10 is a cross-sectional view of an improved fastener pin pull portion and installation tool configuration in accordance with an embodiment of the invention and four sequential installation steps for swaging the fastener collar employing the improved pin pull portion using a different collet; and FIG. 11 is a cross-sectional view of an end portion of the different collet for the installation tool of FIG. 10.

DETAILED DESCRIPTION

Directional phrases used herein, such as upper, lower, front, back, etc., relate to the orientation of the elements shown in the drawings and are not limiting upon the claims.

As used herein, the term "number" refers to one or more than one (e.g., a plurality).

As employed herein, the term "as-headed" refers to a collar which is strain hardened, for example, from cold working, rather than changing hardness using a thermal process (e.g., quench and tempering; stress relieving). The collars of the present invention exhibit high strength (e.g., Grade 5 or 8 strength), without requiring thermal processing.

As used herein the phrase "low swage load," is used for comparative purposes to describe the reduction in required swage load afforded by the features (e.g., as-headed collar; reduced diameter pintail pull portion; modified thread form) of the fastening system of the present invention in comparison with known fasteners of a similar Grade. Representative examples of such low or reduced swage load are quantified in the tables and corresponding disclosure herein.

Similarly, as used herein, the phrase "reduced wall thickness" is used for comparative purposes to describe the thinner wall structure of the collar of the present invention in comparison with collars of known fasteners of similar Grade. For example, the wall thickness of the exemplary collar is of reduced thickness, having less volume of material and thus being structured not to overpack the lock grooves, unlike many known fasteners.

As employed herein, the term "pull portion" refers to the exemplary pin pull portion of the fastener pin and complimentary installation tool pull section for engaging the same. As will be discussed herein, the exemplary pull portion configuration comprises a substantially straight, reduced diameter, parallel side pull portion which protrudes less distance from the end of the lock groove portion of the pin than, for example, the tapered, acorn-shaped pull portion and complimenting tool section of U.S. Pat. No. 4,299,519, which is incorporated herein.

As employed herein, the phrase "thread form" refers to the exemplary improved pin lock groove thread form of the invention. The novel thread form is a hybrid in that, among other new features, the thread form is, in part, a hybrid of certain features of various thread forms. It will, however, be appreciated that various testing and experimentation was required in order to develop the exemplary hybrid thread form and achieve the associated advantages attributable thereto.

While examples of fasteners of the present invention are defined with reference to certain specific sizes, i.e., nominal diameters, the concepts can be readily extended to fasteners over a wide range of sizes (e.g., diameters; lengths).

As shown in FIGS. 1-3 and 7, the present invention relates to multi-component (e.g., pin and collar) swage-type fasteners, such as, for example, the fasteners shown and described in the '024 patent, supra, which has been incorporated herein by reference. In FIGS. 1-3, 6B, 6C and 7 comparable fastener components are numbered the same in each of the Figures, but include the distinguishing designation of the letter "a" (FIG. 2), "b" (FIG. 3) "c" (FIG. 6B) and "d" (FIGS. 6C and 7) and, unless described otherwise, can be considered to be substantially the same. A first feature of the exemplary low swage load fastening system 50, an as-headed collar 14 is shown as employed on each of the fasteners 10, 10a, 10b, 10c and 10d of FIGS. 1, 2 and 3, 6B, 6C and 7 respectively.

Figure 1:
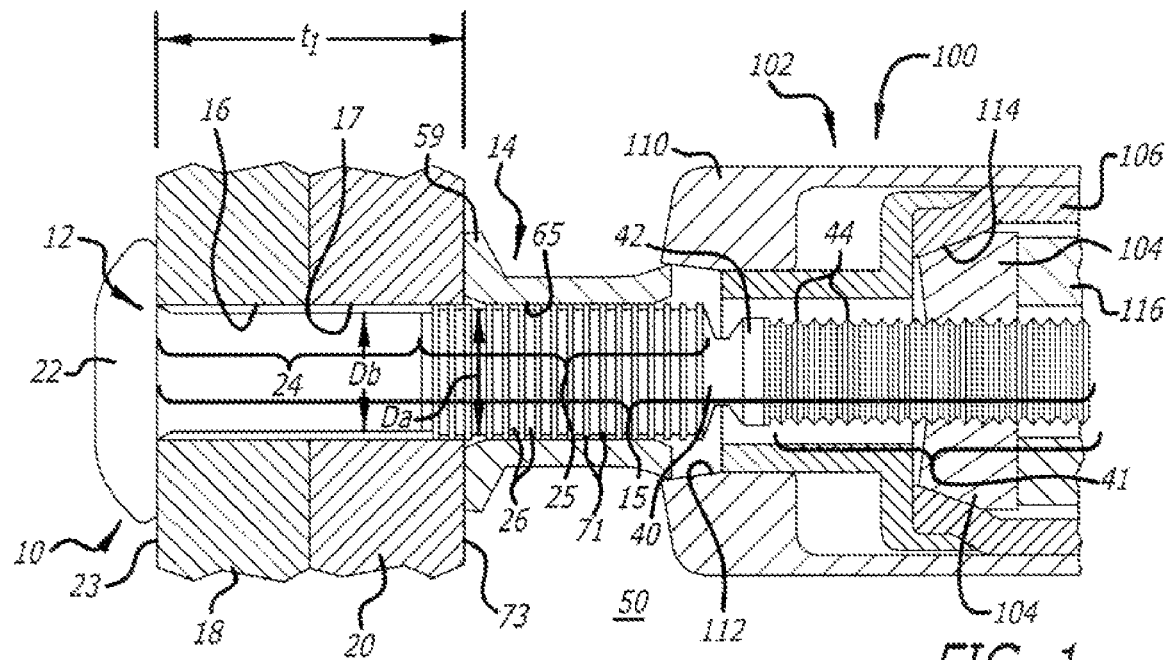
FIG. 1 is a cross-sectional view of the low swage load fastening system and an as-headed collar therefor in accordance with an embodiment of the invention, as employed on a swage-type fastener, having a pin that includes a removable pintail, with the fastener shown inserted through aligned holes in two workpieces before being swaged by an installation tool, which is partially shown.

FIG. 1 shows a fastener 10 including a pin member 12 with a pintail 41 and the as-headed, low swage load collar 14 of the present invention. The pin member 12 has an elongated shank 15, which extends through aligned openings or bores 16 and 17 in a pair of workpieces 18, 20, respectively, which are to be secured together. An enlarged, protruding head 22 at one end of the shank 15 engages the back surface 23 of workpiece 18. The shank 14 has a straight, smooth cylindrical shank portion 24 adjacent the head 22 which is adapted to be received within the aligned bores 16 and 17 with a clearance fit. However, it will be appreciated that in some installations the straight shank portion 24 can be sized to provide a close tolerance or interference fit with one or both of the bores 16 and 17. Adjacent and integral with the straight shank portion 24 is a locking shank portion 25 having a plurality of circumferentially extending, annular lock grooves 26.

The fastener 10 of FIG. 1, as previously discussed, includes a pintail or pull shank portion 41 having a straight annular land 42 followed by a plurality of annual pull groves 44. A breakneck groove 40 having a reduced root diameter is located between the locking portion 25 and the annular land 42 of the pull portion 41 and defines the weakest section on the pin shank 15. The pull portion 41, including the land 42 and pull grooves 44, is of a reduced diameter Da, relative to the diameter Db of the crests 71 of the locking grooves 26 of the locking portion 25. Diameter Db is also the same as that of the straight shank portion 24. It will be appreciated, however, that, in applications involving a close tolerance or slight interference fit (not shown) with the bores 16 and 17, the crests 71 of the locking grooves 26 will be of a diameter smaller (not shown) than that of the straight shank portion 24. The pull grooves 44 are adapted to be gripped by an installation tool 100 which is employed to set the fastener 10 in the manner shown and described in the '024 patent, supra.

Tooling 100 required for installation (e.g., swaging) of the collar 14 can be generally constructed in a manner known to those skilled in the art and is, therefore, only partially shown for purposes of simplicity. In summary, the tool 100 has a nose assembly 102 with a plurality of circumferentially spaced jaws 104 adapted to grip the pull grooves 44 of the pull shank portion 41. Jaws 104 are located in a tubular collet assembly 106 which is slidably supported in an anvil housing 108, which terminates at one end in a swage anvil section 110 having a swage cavity 112. The jaws 104 are normally resiliently urged axially forward in conical tracks 114 to the radially closed position, shown, by a jaw follower assembly 116 (partially shown in FIG. 1). However, it will also be appreciated that, as discussed herein, that other suitable installation configurations (see, e.g., reduced diameter pintail pull portion 177 of FIGS. 7-9) and methods other than those shown and described with respect to FIGS. 1-3 are contemplated by the exemplary low swage load fastening system 50.

Figure 2:
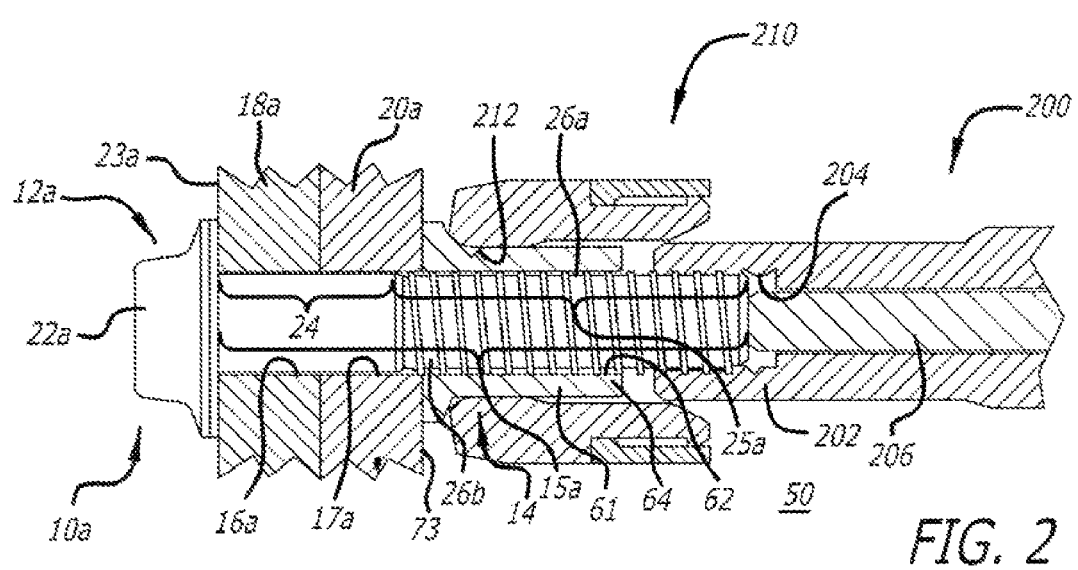
FIG. 2 is a cross-sectional view of the low swage load fastening system and the as-headed collar of FIG. 1 as employed on a pintail-less swage-type fastener, with the fastener shown after being swaged by installation tool, in order to secure two workpieces together.
Figure 3:
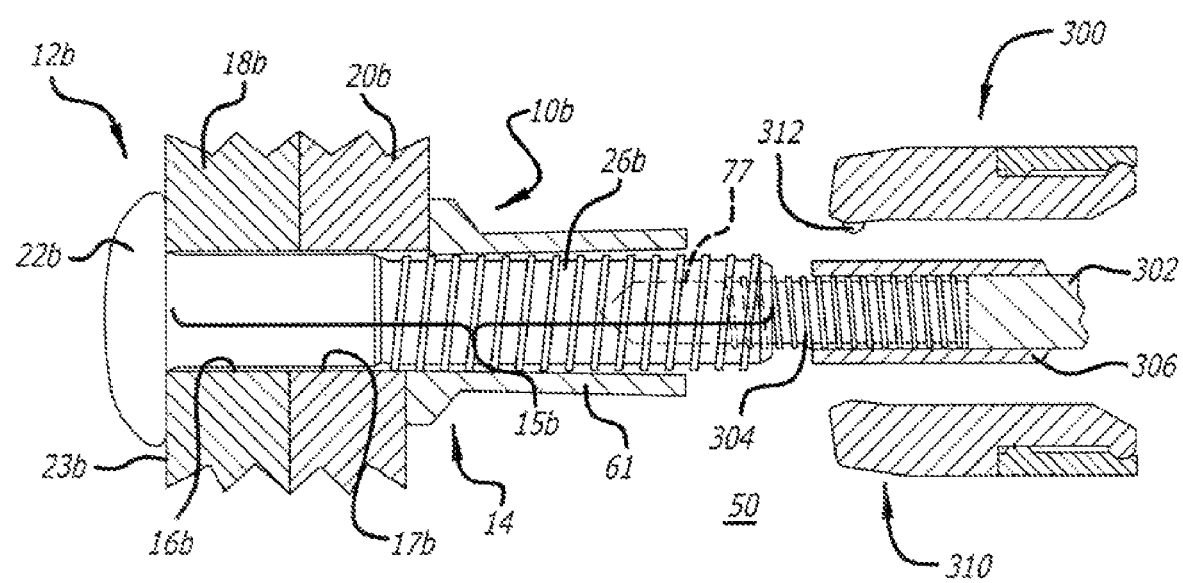
FIG. 3 is a cross-sectional view of the low swage load fastening system and the as-headed collar of FIG. 1 as employed on a pintail-less swage-type fastener before being swaged by an installation tool having an internal drive, in accordance with another embodiment of the present invention.

FIGS. 2 and 3 show the exemplary collar 14 as employed on two representative varieties of pintail-less fasteners 10a, 10b, respectively. The Figures further illustrate how the exemplary collar 14 is readily employable with a wide variety of known installation tools. For example, FIG. 2 shows an installation tool 200 including an external drive 202 with an internal threaded bore 204 and a sensing rod 206. This installation tool 200 is also discussed in detail in the '024 patent, which is incorporated herein. Briefly, the external drive 202 engages grooves 26a and drives or applies a relative axial force on the swage anvil 210 such that it receives the collar 14 within the swage cavity 212 and swages the collar 14 as the workpieces 18a and 20a are secured together.

FIG. 3 illustrates the exemplary collar 14 as employed with another type of pintail-less fastener 10b. The pin shank 15b includes an internal threaded bore 77 adapted for use with an installation tool 300 including an internal drive 306 with a drive rod 302 having threads 304 corresponding to the threads of the internal bore 77. Such installation tool is also shown and described in the '024 patent. In summary, the internal drive 306 of the installation tool 300 engages the internal bore 77 of the pin shank 15b and draws the swage anvil 310 toward the collar 14 such that it is received and swaged within the swage cavity 312.

Accordingly, it will be appreciated that the as-headed, low swage load collar 14 of the present invention may be employed with a wide variety of fasteners, and tools therefor, including fasteners of both the pintail and pintail-less varieties, which have conventional annular or helical lock groove thread forms with deeper and narrower grooves or reduced pitch in comparison with the modified thread form shown in FIGS. 2-3 and described in connection with the invention of the '024 patent, supra. This is a significant improvement because, as will now be briefly discussed, although the structure of the fastener of the '024 patent results in the requisite swage load being reduced to a manageable magnitude, in order to do so, it requires a drastically changed thread form and the collar is heat treated (e.g., quench and tempered; stress relieved) in order to achieve the necessary material properties (e.g., strength). The collar 14 of the present invention, although applicable with fasteners of the aforementioned revised thread form, (see, e.g., FIGS. 2-3) may also be readily employed with fasteners having a more traditional or conventional thread form with narrower and deeper lock grooves. See e.g., FIGS. 7 and 7A and the accompanying disclosure in the '024 patent. As will be discussed herein, the exemplary as-headed collar 14 may also be readily employed with the improved hybrid thread form 26d (FIG. 6) of the exemplary fastening system 50 of the invention.

Figure 4:
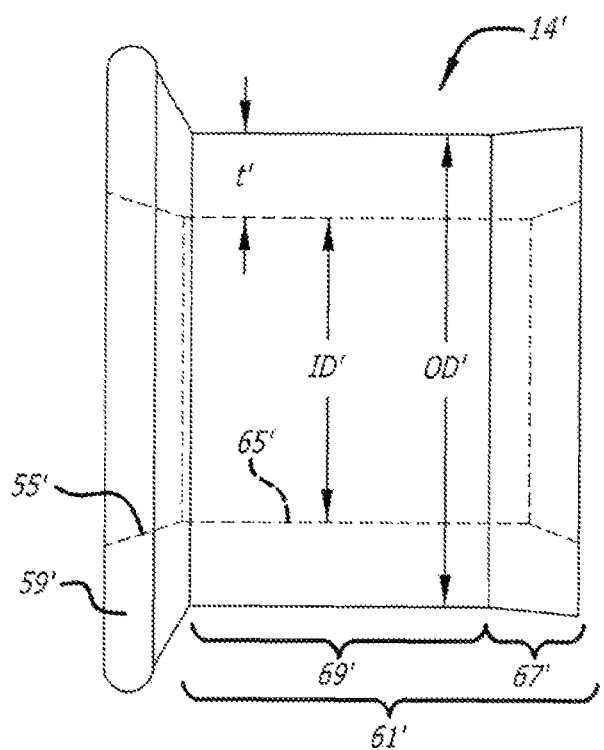
FIG. 4 is a plan view of a prior art collar for a swage-type fastener, with the inner bore of the collar shown in hidden line drawing.
Figure 5:
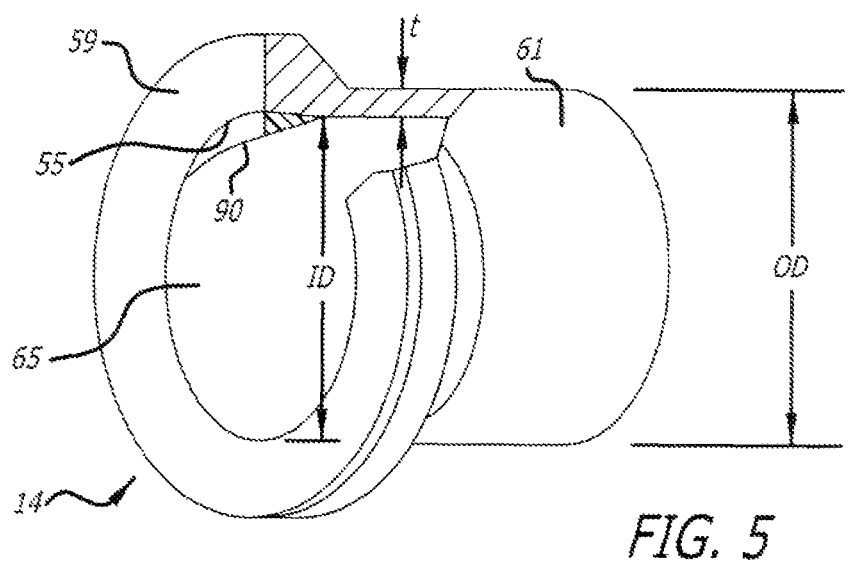
FIG. 5 is an isometric view of the as-headed collar of FIGS. 1-3 which has a reduced wall thickness in accordance with an embodiment of the present invention, with a portion of the collar cut away for simplicity of illustration.

Referring to FIGS. 4 and 5, a known prior art collar (e.g. 14') is compared to the exemplary collar 14 of the present invention. The collar 14' includes an enlarged optional diameter flange 59' with a cylindrical shank 61' and a through bore 65'. The collar shank 61' is of a generally uniform cylindrical configuration with a generally uniform wall thickness t'. The collar 14' has a straight shank portion 69' which terminates at its outer end in a radially outwardly flared shank portion 67', also generally of thickness t'.

Like the exemplary collar 14 (FIGS. 1-3, 5 and 7) of the present invention, before being swaged, the collar 14' is adapted to be disposed over the pin shank 15 (see, e.g., FIG. 1) and, with the workpieces 18, 20 (FIG. 1) pulled together, will have the collar shank 61' in radial alignment with the locking grooves 26 (FIG. 1). At the same time, the flange 59' will be in engagement with the outer surface 73 of workpiece 20. The workpieces 18 and 20 have a combined thickness t1 (FIG. 1) defining a nominal grip of the fastener (e.g., 10). However, it will be appreciated that the fastener 10 can be employed over a predetermined grip range, which varies from workpieces having a minimum total thickness less than t1 (not shown) to a maximum total thickness greater than t1 (not shown).

As discussed in the '024 patent, which is incorporated herein by reference, the relative axial load required to swage the collar shank 61' is minimized by reducing the clearance between the straight collar bore portion 69' of uniform diameter and the crests 71 (see, e.g. FIG. 1) of the lock grooves 26. In the invention of the '024 patent this radial clearance is significantly reduced radially to around one half of that of the conventional lockbolt. See e.g., FIG. 7 of the '024 patent (illustrating the thread form of a typical swage-type fastener). Because of the close radial clearance provided by the minimized inside diameter ID', the outside diameter OD' can be reduced to the thickness t' necessary to provide the desired volume. Thus, as discussed in the '024 patent, the inside diameter ID' and outer diameter OD' are selected to provide the desired wall thickness t' of collar shank 61' resulting in the necessary volume of collar material for swage and the desired amount of lock groove fill, while providing the desired reduction in swage load.

Figure 8:
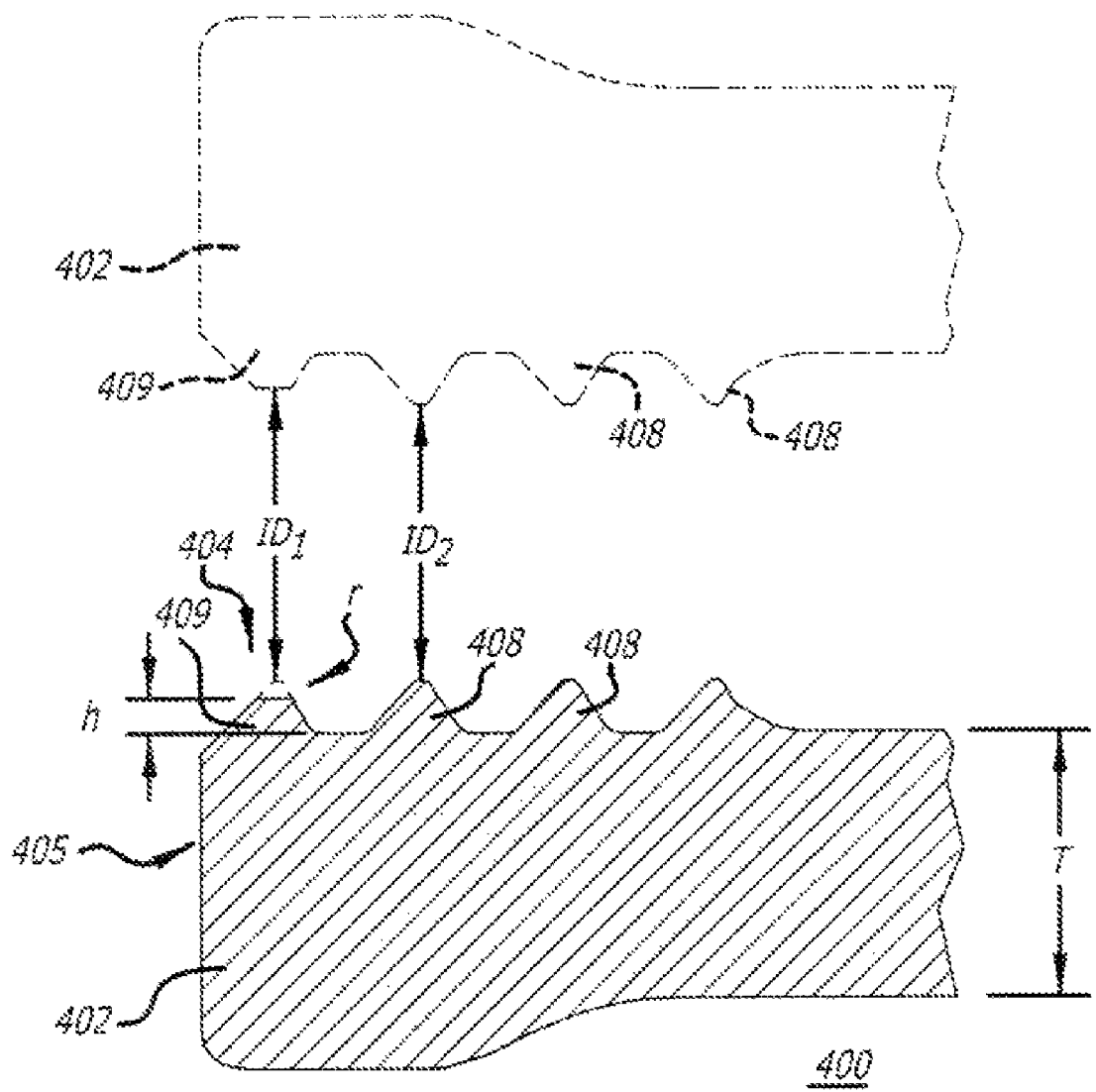
FIG. 8 is a cross-sectional view of an end portion of the collet for the installation tool of FIG. 7.
Figure 9A:
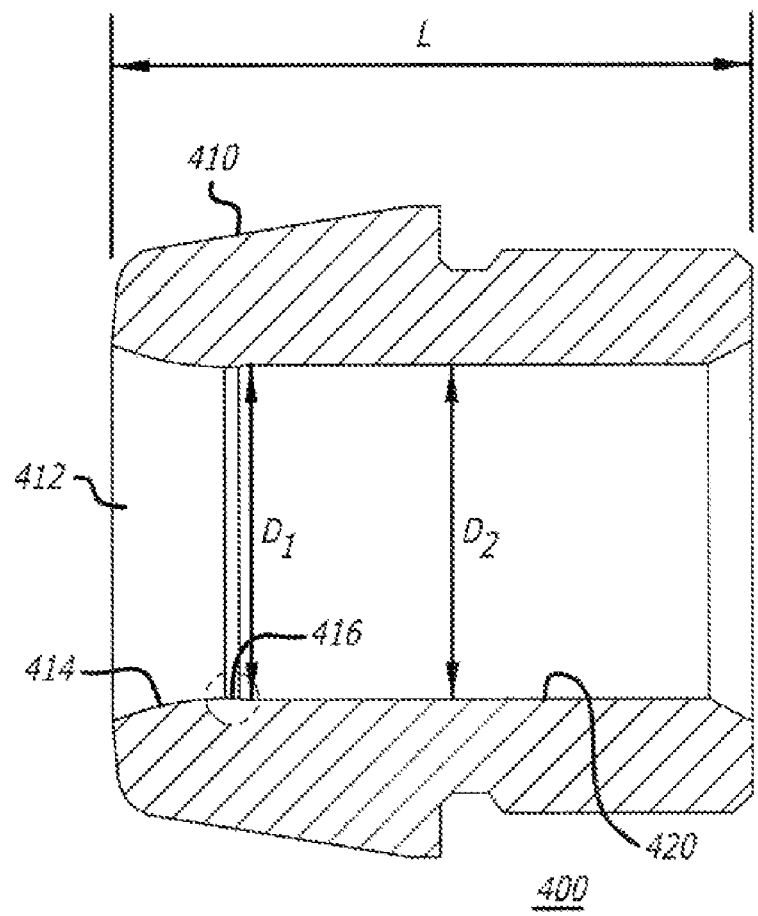
FIG. 9 is a cross-sectional view of the anvil member of FIG. 7.

However, as shown in FIGS. 4A, 7A, 8A and 9A of the '024 patent, and discussed in the accompanying disclosure, such fastener and collar 14' therefor, requires a modified thread form to include lock grooves 26, which are wider and generally shallower (comparing the modified groove structures shown in FIGS. 4A, 8A and 9A of the '024 patent with the prior art fastener of FIG. 7A). Additionally, although the modified fastener thread form helps overcome the aforementioned high swage load, it also requires cost intensive thermal processing of the collar 14' in order to maintain the requisite material properties (e.g., strength).

Accordingly, in view of the foregoing known attempts to improve swage-type fastener design, it has been a well recognized, long standing desire within the fastener art to provide an economical, high Grade fastener which exhibits an optimum balance of low swage load and high strength. While the aforementioned fasteners have substantially met the goal of reducing swage load, they have, thus far, only been able to do so through use of cost intensive collar heat treatment and modifications to the thread form. Among the ways that the low swage fastening system 50 of the present invention overcomes these disadvantages is by providing the aforementioned improved collar 14 which is readily employable with a wide variety of existing fasteners and thread forms thereof, and, is employable as-headed, without requiring a heat treatment, while still exhibiting high Grade (e.g., Grade 5 and Grade 8) material properties (e.g., without limitation, strength). The collar 14 is, therefore, retroactively employable with existing fasteners as an improved stand alone component, or alternatively in combination with the other low swage features of the exemplary fastening system 50.

FIG. 5 shows a more detailed, isometric view of the exemplary as-headed, low swage load collar 14, which is shown as employed with fasteners. 10, 10a, 10b, 10c, 10d in FIGS. 1-3 and 7, respectively. A portion of the collar 14 is cut away to illustrate the exemplary reduced wall thickness t of the collar 14 (compare, for example, to thickness t' of collar 14' in FIG. 4). Thus, for a fastener of comparable Grade, the collar 14 of the present invention will have an inside diameter ID substantially equivalent to the outer diameter Db of the lock groove crest 71 (FIG. 1), similar to ID' of the collar 14' of FIG. 4. However, the outside diameter OD of the exemplary collar 14 is less than OD' of the prior art collar 14', thereby resulting in the exemplary reduced wall thickness t of the collar shank 61. As will be discussed in greater detail herein, the reduced wall thickness t results in a smaller volume of material to be swaged into the lock grooves (e.g., 26, 26a, 26b, 26c, 26d of FIGS. 1-3, 6B, 6C and 7 respectively). This, in combination with the increased hardness of the exemplary collar 14, results in the lock grooves (e.g., 26, 26a, 26b, 26c, 26d) not, being overpacked, which is directly opposite of many known prior art collar designs. Also, by reducing the collar ID, there is less distance traveled by the collar during swage to engage the lock grooves. Less swage load is spent in swaging the collars of the present invention into the lock grooves because the collars have less clearance from the outer diameter of the crests that the prior art. In prior art lockbolt systems, more clearance was provided between the collars and the outer diameter of the crests so that more swage load was applied to the collar to swage it through air before being swaged into the lock grooves. The reduced wall thickness t, not overpacking the lock grooves 26, 26a, 26b, 26c and 26d and reduced clearance between the collar and the outer diameter of the crests of the lock bolt reduces the relative axial load required to swage the exemplary collar 14.

Accordingly, the present invention accomplishes the similar goal of reduced swage load in a more economical, improved manner than the known prior art. It will be appreciated that the exact difference or amount of reduction in the wall thickness t of the exemplary collar 14 in comparison, for example, with wall thickness t' of collar 14', will be partly dependent upon the size (e.g., without limitation, ½ inch, ⅝ inch, ¾ inch) of the particular fastener at issue. For example, the difference in collar wall thickness will likely be greater between a pair of ¾ inch fasteners of comparable Grade, than, for example between a pair of ¼ inch fasteners of comparable Grade. Examples of the effects of the reduced thickness, t, of the collar shank 61 of the present invention, as well as representative numbers for such thickness, will be further explained and appreciated through discussion of the following examples. The examples illustrate and discuss the results of several experiments conducted for the purpose of evaluating the effects of reduced collar shank 61 wall thickness t on as-headed, high-strength collars 14 and fasteners (e.g., 10, 10a, 10b, 10c and 10d). The following examples are provided to further illustrate the improvements and are not limiting upon the invention.

EXAMPLE 1

The purpose of the first experiment was to determine if collars made to HS5CF-R12 dimensions could be used as-headed to meet Grade 8 values. The HS5CF-R12 fastener is a commercially available Grade 5, swage-type fastener which is manufactured by Huck International, Inc. of Waco, Tex.

The experiment involved a test of the outer diameter (OD), hardness, swage load, tensile and preload of standard quench and tempered Grade 8 collars which were tested and compared against as-headed Grade 5 collars. The results are quantified in Table 1 herein below.

TABLE 1

| | Grade 5 As-Headed Collar | | |
|---|---|---|---|
| Collar Description | HS8CF-R12 | Collar "A" | Collar "B" |
| Heat Treat Condition | Quench-Temper | As-Headed | 900 F. Stress |
| Collar Hardness | Rb77 | Rb90 | Rb89 |
| Collar Outside Diameter | .568" | .562" | .562" |
| Tensile (Spec: 11,600 min.) | 13,070 lbs. | 12,400 lbs. | 12,730 lbs. |
| Percent over spec. | 13% | 7% | 10% |
| Preload (Spec: 7,400 min.) | 8,390 lbs. | 8,040 lbs. | 7,570 lbs. |
| Percent over spec. | 13% | 9% | 2% |
| Swage Load | 5,850 lbs. | 4,860 lbs. | 4,800 lbs. |
| Percent decrease from Standard | | 18% | 18% |
| HS7 Minimum Swage | 7,000 psi | 5,700 psi | 5,700 psi |
| Percent decrease from standard | | 19% | 19% |

As shown in Table 1, both Collars "A" and "B" had a swage load which was 18% lower than the current standard HS8CF-R12 collar, and both meet the minimum industry tensile and preload requirements of Grade 5. The experiment uncovered that the as-headed collar, Collar "A", had two distinct advantages over Collar "B":

1) Collar "A" does not require a heat treatment operation (e.g., quench and temper; stress relieve), and therefore, also does not receive an additional step of cleaning or decarburizing the collar; and 2) Collar "A" had a significantly higher preload margin above the minimum industry specification than Collar "B".

Although Collar "A" did not have quite as high actual tensile and preload as the current standard Grade 5 collar, it had a significantly (18%) lower swage load. Accordingly, the test confirmed that as-headed collars having a reduced OD and thus wall thickness, in accordance with the present invention, can economically achieve a reduced swage load (18%) while exhibiting optimum material properties.

EXAMPLE 2

The second experiment arose out of the desire to develop an economical way to improve installation tool life and to reduce the cost of making Grade 8 collars. Specifically, the goal of the experiment was to determine if thinner-walled, as-headed collars can increase snub load, decrease swage load, and maintain the same tensile and preload as standard quench and tempered collars. Snub load is the load at which the collar 14 first engages the pin lock grooves 26, 26a, 26b, 26c, 26d. After this point, sheet (e.g., workpiece 18, 20; 18a, 20a; 18b, 20b; 18c, 20c) gap pull-out is restricted because the collar 14 is stuck on the pin 12, 12a, 12b 12c, 12d. If a gap remains after snub, clamping is reduced because collar elongation goes into diminishing the gap instead of stretching the pin 12, 12a, 12b, 12c, 12d.

HSCF-R20 collars from the same work order and raw material (50 KSI tensile) were divided into four groups. HSCF-R20 collars are commercially available collars which are manufactured by Huck International, Inc. of Waco, Tex.

Group 1 was the control group and was processed in the conventional manner (e.g., by quenching and tempering). Collar OD was 1.009".

Group 2 was as-headed and had the collar OD turned down to 1.000".

Group 3 was as-headed and had the collar OD turned down to 0.995".

Group 4 was as-headed and had the collar OD turned down to 0.990".

All of the collars were shot blasted and waxed to have the same surface texture and lubricant. Additionally, the same work order of pins was used for all tests, as was the same installation tooling and the same testing instruments. Three tests were made with each group for each category of snub load, swage load, preload and tensile. To simplify the report, only the averages of the tests are reported in Table 2 herein.

TABLE 2

Thin-Walled, As-Headed Collars

|  | Hardness Rb | Snub Lbs | Swage Lbs | Preload Lbs (26,080 min.) | Tensile Lbs (37,300 min.) |
| --- | --- | --- | --- | --- | --- |
| Quench-Tempered 1.009" OD | 76 | 5,670 | 18,730 | 28,000 | 38,600 |
| As-Headed 1.000" OD | 88 | 8,770 | 17,570 | 28,670 | 41,570 |
| .995" OD | 88 | 7,590 | 15,870 | 27,000 | 39,470 |
| .990" OD | 88 | 7,300 | 14,070 | 24,000 | 36,970 |

The collar OD tolerance range for standard collars is 1.006" to 1.012". Using the same tolerance range for as-headed collars, the allowable collar OD range is between about 0.995" to 1.001." As shown, the OD values in Table 2 range from about 0.990" to 1.009" and can be taken as the minimum and maximum. The average values of 1.000" and 0.995" can, therefore, be compared directly against the 1.009" nominal values.

As shown from the results quantified in Table 2, as-headed collars offer the following advantages over standard quench and tempered collars:

1. Improved mechanical values: about 44% greater snub (gap pullout) load, about 11% lower swage load, about 5% More tensile strength and the same preload. Preload is about 7% above the minimum industry specification with both types of collars, but tensile strength improves from about 3% over the minimum specification to about 9% over specification when using the as-headed collar. The as-headed collar also provides a decrease in installation tool pressure of about 10% to 20% which is a very significant advantage resulting in reduced tool wear, more accessible smaller tools and lighter weight tools.

2. Improved quality: Case and decarburizing problems are eliminated when collars are not quenched and tempered. Additionally, consistency of hardness remains the same because as-headed collars stay within a hardness range of about 10 Rb. It is also possible that certain quenched and tempered collars might not meet tensile requirements if hardness approaches the minimum Grade specification of Rb 68. This is not a problem with the increased hardness of the exemplary as-headed collars.

3. Reduced Cost: By eliminating heat treatment and the blast clean step, associated therewith, as-headed collars reduce manufacturing costs. Additionally, collar raw material costs can be reduced by replacing annealed AISI 1010 steel wire, which is commonly used to produce the collars, with hot-rolled AISI 1006 wire, which may be used to produce the exemplary as-headed collars because it work hardens substantially the same amount as annealed AISI 1010 steel wire. As-headed collars may be made from unannealed or annealed low carbon steel. It is also unannealed and, therefore, less expensive.

4. Reduced lead time: Eliminating heat treatment and inspection associated therewith saves about two or three days of the time typically required to produce the collars.

Accordingly, the results of EXAMPLE 2 further confirm the advantages of using an as-headed collar in accordance with the present invention. Additionally, when viewed in conjunction with EXAMPLE 1, the ability of the fastener and collar therefor of the present invention to reduce installation tool component (e.g., anvil; thimble) wear and thus increase tool life becomes evident. While anvil wear would be expected to increase because the exemplary as-headed collars are harder, it has been discovered through the present invention that, anvil wear will in fact does not significantly change upon reducing the OD and thus wall thickness, t, of the exemplary collar 14 and thimble life is increased as a result of the reduced tool pressure required.

EXAMPLE 3

Further to the results of the first two experiments, the third experiment further tested the effects of increasing collar hardness while decreasing collar wall thickness, in an attempt to find an optimum balance of high strength and low swage load. Gap pullout results in less than optimum clamp on the joint. However, increasing collar hardness also increases the swage force to install the collar, as evidenced in EXAMPLE 2. Decreasing the wall collar thickness lowers the swage force disproportionately more than the snub (gap pullout) load. Accordingly, combining the discoveries of the foregoing experiments, this experiment was intended to overcome known fastener design limitations by balancing increased collar hardness with a decrease in collar wall thickness in order to maintain the same tensile and preload and increase snub load while decreasing the swage load, thereby improving installation tool life. It was also a goal of the experiment to accomplish the foregoing without making a change to the standard pin or installation tool in order to keep potential future changeover to the new collar as simple and cost effective as possible.

For consistency, the same work order of collars was used throughout the test. Collar wall thickness was decreased by machining down the collar OD in. 0.010" increments. Snub load, swage load, ejection load, preload and tensile strength were inspected for the optimum wall thickness. The most consistent way to significantly raise collar hardness, as learned from EXAMPLES 1 and 2, was to leave the collars as-headed, which gave a net hardness increase of between about 20-25 Rb points. Once the optimum collar wall thickness was determined, the same tests were done to compare standard pins with pins of the type described hereinbefore in connection with the 024 patent, the latter having been heat treated to the same hardness and pinbreak. This was done to determine the effect of lock groove form. All testing was done on production test equipment using standard test procedures.

To simplify the report and because there was insignificant variation between tests, only the average value of three tests for each condition is reported. Table 3 herein shows the result of the exemplary reduced collar wall thickness when employed with pins of a standard thread form.

TABLE 3

| | Reduced Collar Wall Thickness Standard Thread Form | | | | | | |
|---|---|---|---|---|---|---|---|
| | Collar Rb | Collar OD" | Collar Wall" | Snub Lbs | Swage Lbs | Eject Lbs | Clamp Lbs | Tensile Lbs |
| Quench Tempered | 72 | .990 | .167 | 6,683 | 19,366 | 2,900 | 26,500 | 35,300 |
| As-Headed | 92 | .990 | .167 | 11,366 | 20,766 | 2,950 | 29,250 | 39,666 |
| As-Headed | 92 | .980 | .162 | 10,766 | 19,033 | 2,966 | 28,000 | 37,633 |
| As-Headed | 92 | .970 | .157 | 9,833 | 17,277 | 2,839 | 26,250 | 33,366 |
| As-Headed | 92 | .960 | .152 | 8,633 | 13,433 | 2,048 | 18,750 | 19,586 |

As can be calculated from Table 3, a calculated as-headed hard collar OD of 0.975" would give identical clamp and tensile values as the current standard collar, but snub load would increase about 54%, and swage load would decrease about 6%. These results further confirm the attributes of the fastener and as-headed, thin-walled, low swage load collars therefor, of the present invention.

Snub, clamp and tensile data for standard lock grooves (e.g., of the type discussed with reverence to FIGS. 7 and 7A of the '024 patent) from this group validate the first group of data in Table 3. Swage load was about 1,300 lbs lower than predicted, or about a 12% reduction instead of the original 6% reduction.

There was no significant difference in values due to lock groove thread form. There was a significant (about 40%) reduction of swage load associated with a revised hybrid lock groove in combination with the hard, thin wall as-headed collar with comparison to the swage loads associated with a standard helical lock groove thread form and a quench and tempered collar.

In summary, the experiment confirms that hardness can be increased consistently by using as-headed collars and collar wall thickness can be reduced because hoop strength is increased from such higher hardness. Reducing the OD of the collar to about 0.975" creates no change in actual preload or tensile values, but increases gap pullout by about 50% and decreases swage by about 10%. Increased hardness of about 20 Rb points also increases calculated wear resistance of the collar by about 40%, and no change is necessary in the pin or swage anvil in order to swage the as-headed collars. Accordingly, not only do the fasteners and collars therefor of the fastening system 50 of the present invention exhibit optimized physical properties, low swage load and economic efficiency, but the collars 14 may also be readily employed with a wide variety of existing fastener pins and thread forms thereof as well as with the improved hybrid thread form 26d (FIG. 6C.) of the invention.

It is desirable that the pin 12, 12a, 12b, 12c, 12d (FIGS. 1-3, 6B, 6C and 7), be hard enough relative to the hardness of the collar 14 to resist crushing or excessive yielding in tension or necking down from the compressive swage loads. Therefore, in one form of the invention, for example, for the Grade 5 type fastener, the pin 12, 12a, 12b, 12c, 12d could be made of AISI 1038 steel or AISI 1541 steel or other comparable materials for the same Grade having a hardness of between about Rc24 to about Rc35 and an ultimate tensile strength of at least 120 KSI. Typically, conventional collars (e.g., 14') for such fasteners were made from AISI 1010 carbon steel, which had to be thermally processed to between about Rb65 to Rb85 and an ultimate tensile strength of at least about 60 KSI.

However, as previously discussed, the exemplary collar 14 is made, for example, from AISI 1006 steel or any other suitable annealed or unannealed low carbon steel material. The AISI 1006 steel is not annealed. Unannealed steel wire, commonly referred to as "green" wire, is less expensive thereby making the exemplary collar 14 more economical to produce. The pin 12, 12a, 12b, 12c, 12d has a sufficient hardness to accept both the high tensile preloads desired and the swage loads on the collar 14 without substantially yielding. In addition the collar 14, like the collars discussed, for example, in the '024 patent, can be coated with a conventional lubricant such as a water soluble polyethylene wax or cetyl alcohol. The collar 14 could also be zinc plated. This assists in maintaining swage loads at the desired low level and also minimizes wear of the swage cavity 112, 212, 312, 412. Thus, as shown through EXAMPLES 1-3, the shank 61 (FIG. 5) of collar 14 is provided with a sufficient wall thickness t and, thus volume, in order to insure that enough collar material will move axially in elongation, but at the same time it will have sufficient strength, such that the pin shoulders 60 (FIG. 1) and collar shoulders, formed during swage, remain in substantially full engagement as the design tensile load on the joint is reached. In this regard, the required wall thickness t (FIG. 5) of the exemplary collar shank 61 will increase slightly for larger diameter fasteners and decrease for smaller diameter fasteners, while remaining thin enough to exhibit the advantages discovered through the present invention, and thinner than known prior art collars of comparable size and Grade. Table 4 further summarizes the improvements of collar 14 by way of a comparison between known quench and tempered collars 14' and the as-headed collar 14 of the invention as employed with known Grade 5 and Grade 8 fasteners 10, 10a, 10b, 10c, 10d and with the improved Grade 5 and Grade 8 fasteners 10c, 10d (FIGS. 6 and 7) of the exemplary low swage load fastening system 50. The various collar dimensions are shown for three different nominal fastener sizes ½ inch, ⅝ inch, and ¼ inch. For the first-two types of fastener, the collar dimensions of the existing quenched and tempered collar 14' are shown first with the values of the as-headed collar 14 of the invention shown indented and offset to the right. Only the as-headed collar valves are shown for the Grade 5 and Grade 8 fasteners labeled "Next Generation". These fasteners employ the exemplary hybrid thread form 126 (FIG. 6C) of the invention, which will be discussed herein.

TABLE 4

Dollar Dimension; Comparison

|  | ½" Dia. | ⅝" Dia | ¾" Disc. |
|---|---|---|---|
| Current C5OI. Grade | | | |
| Q/T'ed collar gap to bolt | .021 | .029 | .034 |
| Q/T'ed collar I.D. | .521 | .654 | .784 |
| Q/T'ed collar O.D. | .798 | .987 | 1.184 |
| Q/T'ed O.D./I.D. ratio | 1.532 | 1.509 | 1.510 |
| Q/T'ed collar wall | .139 | .167 | .200 |
| As-headed collar gap to bolt | .021 | .029 | .034 |
| As-headed collar I.D. | .521 | .654 | .784 |
| As-headed collar O.D. | .789 | .975 | 1.171 |
| As-headed O.D./I.D. ratio | 1.514 | 1.491 | 1.494 |
| As-headed collar wall | .134 | .161 | .193 |
| Current HP8/HF/HS Grade 8 | | | |
| Q/T'ed collar gap to bolt | .022 | .023 | .033 |
| Q/T'ed collar I.D. | .521 | .648 | .783 |
| Q/T'ed collar O.D. | .812 | 1.009 | 1.213 |
| Q/T'ed O.D./I.D. ratio | 1.559 | 1.557 | 1.549 |
| Q/T'ed collar wall | .145 | .180 | .215 |
| As-headed collar gap to bolt | .022 | .023 | .033 |
| As-headed collar I.D. | .522 | .648 | .783 |
| As-headed collar O.D. | .803 | .998 | 1.200 |
| As-headed O.D./I.D. ratio | 1.538 | 1.540 | 1.533 |
| As-headed collar wall | .141 | .175 | .209 |
| Next Generation Grade 5 | | | |
| As-headed collar gap to bolt | .010 | .013 | .016 |
| As-headed collar I.D. | .510 | .638 | .766 |
| As-headed collar O.D. | .756 | .945 | 1.134 |
| As-headed O.D./I.D. ratio | 1.482 | 1.481 | 1.480 |
| As-headed collar wall | .123 | .154 | .184 |
| Next Generation Grade 8 | | | |
| As-headed collar gap to bolt | .010 | .013 | .016 |
| As-headed collar I.D. | .510 | .638 | .766 |
| As-headed collar O.D. | .766 | .958 | 1.150 |
| As-headed O.D./I.D. ratio | 1.502 | 1.502 | 1.501 |
| As-headed collar wall | .128 | .160 | .192 |

As shown in Table 4, it has been found with the as-headed collar of the present invention that the ratio of the O.D. to the I.D. of an as-headed collar is about: (i) 1.491 for an existing ⅝ inch Grade 5 fastener, (ii) 1.540 for an existing ⅝ inch Grade 8 fastener, (iii) 1.481 for a ⅝ inch next generation Grade 5 fastener, and (IV) 1.502 for a ⅝ inch next generation Grade 8 fastener. A suitable range of the ratio of O.D. to I.D. for a collar of the present invention would likely be about 1.47 to 1.55 or any other range falling within that range. Additional exemplary embodiments of ranges are not set forth for the purpose of simplifying the specification. With the prior art quench and tempered collars, it was found that the ratio of O.D. to I.D. of the collar is about: (i) 1.509 for a ⅝ inch Grade 5 fastener and (ii) 1.557 for a ⅝ inch Grade 8 fastener.

The reduction in swage load permits a reduction in the size of the installation tool (e.g., 100, 200, 300 of FIGS. 1-3, respectively; see also installation tool 400 of FIGS. 7-9) resulting in a corresponding reduction in weight of up to 40% compared to the weight of conventional installation tools. See, e.g., the '024 patent, supra, (discussing tool weight reduction as compared to the tool 148 of FIG. 7, therein).

In view of the fact that many fasteners (e.g., 10, 10a, 10b, 10c, 10d) with which the collar 14 of the present invention may be employed, have pull portions and/or pintails of reduced size and/or length, it may be desirable to provide a mechanism for holding the pin and collar together when first pre-assembling it to workpieces, in preparation for installation. Therefore, the collar may optionally be provided with a flexible pre-assembly tab 90 (FIG. 5). See, e.g., U.S. Pat. No. 4,813,834. The structure and operation of the optional assembly tab 90, if employed, would be much the same as disclosed in the '834 patent, supra, such disclosure being hereby incorporated herein by reference as if fully set forth herein. Briefly, the assembly tab 90 is located in the countersunk bore portion 55 of collar 14 and is of a limited circumferential length. The assembly tab 90, as noted in the '834 patent, supra, is preferably of a flexible construction and, as such, can be made of a plastic material such as, for example, polyurethane. The tab 90 extends radially inwardly a distance sufficient to be located within the lock grooves such as grooves 26, 26a, 26b, 26c, 26d. In this manner, once located in one of the lock grooves, the collar 14 will be held onto the associated pin 12, 12a, 12b, 12c, 12d. The tab 90 is located within the countersunk bore portion 55 which is at a point in line with the flange 59. Optional tab 90 facilitates movement of the collar 14 onto the pin and the indexing of the tab 90 over the lock groove crests. It will be appreciated that the tab 90 could alternatively be located at the opposite end of the collar 14. It will also be appreciated that the collar need not employ the optional tab 90.

It will also be appreciated that one or more portions of the collar 14 may be of a different configuration than that which is shown and described in herein. For example, the collar could be flangeless (not shown) or may have a flange of reduced size (not shown) and/or the collar might not include the countersink bore portion 55. Additionally, the collar 14 may optionally include such a countersink bore portion at the opposite end of the collar (not shown). It will also be appreciated that, as discussed in U.S. Pat. No. 4,867,625, the optional assembly tab (e.g., 90) may comprise a more substantial, limited thread (not shown) of a preselected extent such that some magnitude of initial clamp of the workpieces can be attained in addition to holding the collar 14 and associated pin in a pre-assembled condition with the workpieces. See e.g., the '625 patent (incorporated herein by reference the disclosure relating to the limited female thread as if fully set forth herein).

Another means by which the low swage load fastening system 50 of the invention reduces swaging loads is shown in FIG. 6C and in particular, by way of comparison of FIG. 6C with FIGS. 6A and 6B. Specifically, as shown in FIG. 6C, a hybrid thread form 26d is provided for the lock grooves 26d of the pin 12d. which improves upon known thread forms such as the waveform lock groove 26b and deep lock groove 26c examples of FIGS. 6A and 6B, respectively. The exemplary thread form of FIG. 6C is defined by a unique hybrid of features including a number of blended radii which provide a substantially smooth transition between the crests 28d, 30d and base of the lock grooves 26d. More specifically, the first crest 28d has a first radius R1, the second crest 30d has a fourth radius R4, and two intermediate radii R2, R3 define the base portion or valley 132 of the groove 26d while simultaneously smoothly interconnecting first radius R1 and fourth radius R4. In this manner. the hybrid thread form 26d (FIG. 6C) improves upon the relatively unsmooth and abrupt transition of the shallow and deep thread forms 26b, 26c of FIGS. 6A and 6B, respectively. In particular, the relatively shallow waveform 26b of FIG. 6A requires many more radii and has a relatively discontinuous transition between and among the radii, and the deep lock groove thread form 26c of FIG. 6B has a relatively sharp, unblended transition between radii. Additionally, the waveform 26b of FIG. 6A has a wide pitch 36b and relatively shallow depth 38b, while the deep thread form 26c of FIG. 6B conversely has a relatively narrow pitch 36c and a much larger depth 38c, as shown.

As can be appreciated with continued reverence to FIGS. 6A and 6B, respectively, the relatively shallow waveform 26b tends to overpack when the collar 14 is swaged, which as previously discussed, disadvantageously increases swage load. Conversely, as shown. the abrupt changes in the deep thread form 26c of FIG. 6B tend to have the opposite effect, with less than the desired amount of engagement occurring between the lock grooves 26c of the pin 12c and the collar 14, when it is swaged.

Referring now to FIG. 6C and comparing the exemplary hybrid thread form 26d with thread forms 26b and 26c of FIGS. 6A and 6B, respectively, it will be appreciated that the hybrid thread form has a somewhat intermediate pitch 36d and depth 38d. This, in combination with the aforementioned blended radii R1, R2, R3, R4 provide a smooth, blended thread form 26d which accordingly promotes the complimentary interlocking engagement of the collar grooves 62 with the lock grooves 26d when the collar 14 is swaged, thereby reducing swage load. The advantages of the exemplary thread form 126 can be further appreciated by the following table of values, Table 5, which summarizes a non-limiting comparative example of values for three different Grade 8, ⅝ inch fasteners having pins 12b, 12c, 12d with the different thread forms 26b, 26c, 26d shown and described with respect to FIGS. 6A, 6B and 6C.

TABLE 5

Thread Fore Comparison ⅝ inch Grade 8 Fastener

| Type of Thread Form | Lock Groove Depth (inches) | Pitch (inches) | Swage Load (lbs.) |
|---|---|---|---|
| Wave form Lock Groove | 0.027 | 0.130 | 16,600 |
| Deep Lock Groove | 0.032 | 0.091 | 14,400 |
| Hybrid Lock Groove | 0.028 | 0.100 | 14,700 |

The deep lock groove thread form set forth in Table 5 was developed to reduce the problems associated with stripping the internal threaded bore 204 depicted in FIG. 2. It was found that increasing the depth of the lock grooves 26c was helpful in reducing damage to the internal threaded bore 204. Thereafter, it was determined that deep lock grooves 26c were not necessary with a pull type mechanism 177 of the type shown in FIG. 7. The hybrid lock groove thread form set forth in Table 5 was developed for use with the pull mechanism 177 of the type shown in FIG. 7.

As shown, the hybrid lock groove thread form 26d (FIG. 6C) has a relatively intermediate depth 38d and pitch 36d when compared with the waveform and deep lock groove thread forms 26b, 26c, respectively, while achieving all of the foregoing advantages, including maintaining a reduced swage load generally comparable to the deep lock groove 26c of FIG. 6B. It will also be appreciated that the exemplary hybrid thread form 26d could be employed in combination with the aforementioned as-headed collar 14, in order to even further reduce swage loads. By way of example, for the ⅝ inch Grade 8 fastener of FIG. 6C and table 5, a reduction in swage load of about 11% from the wave form lock groove can be expected when the exemplary hybrid thread form 26d of FIG. 6C is used in combination with the aforementioned as-headed collar 14. Also, for the ⅝ inch Grade 8 fastener of FIG. 6C and Table 5, a reduction in swage load of about 40% from a standard helical lock groove thread form can be expected when the exemplary hybrid thread form 26d of FIG. 6C is used in combination with the aforementioned as-headed collar 14.

It has been found with the as-headed collar of the present invention that the ratio of the shear strength between a pin and a collar is about: (i) 1.8 for a Grade 8 fastener and (ii) 1.6 for a Grade 5 fastener. A suitable range of the ratio of shear strengths between a pin and a collar of the present invention would likely be about 1.5 to 2.1 or any other range falling within that range. Additional exemplary embodiments of ranges are not set forth for the purpose of simplifying the specification. With the prior art quench and tempered collars, it was found that the ratio of shear strength between a pin and a collar is about: (i) 2.5 for a Grade 8 fastener and (ii) 2.2 for a Grade 5 fastener.

It has also been found with the as-headed collar of the present invention that the lock grooves are typically packed: (i) about 40% for the deep lock groove 26c thread form and about 60% for the hybrid lock groove 26d thread form for a Grade 8 fastener and (ii) about 30% for the deep lock groove 26c thread form and about 50% for the hybrid lock groove 26d thread form for a Grade 5 fastener. Use of the deeper lock groove with less than an overpacking of the lock grooves has been found desirable from the standpoint of accommodating painted finishes that are applied to the pin which accumulate in the troughs of the lock grooves.

It has also been found that the typical ratio of the pitch length to the depth of the lock groove is about 2.8 for the deep lock groove thread form and about 3.6 for the hybrid lock groove thread form. A suitable range of the typical ratio of the pitch length to the depth of the lock groove would likely be about 2.5 to 4.0 or any other range falling within that range. The prior art wave form lock groove had a typical ratio of the pitch length to the depth of the lock grooves of about 4.8.

Figure 7:
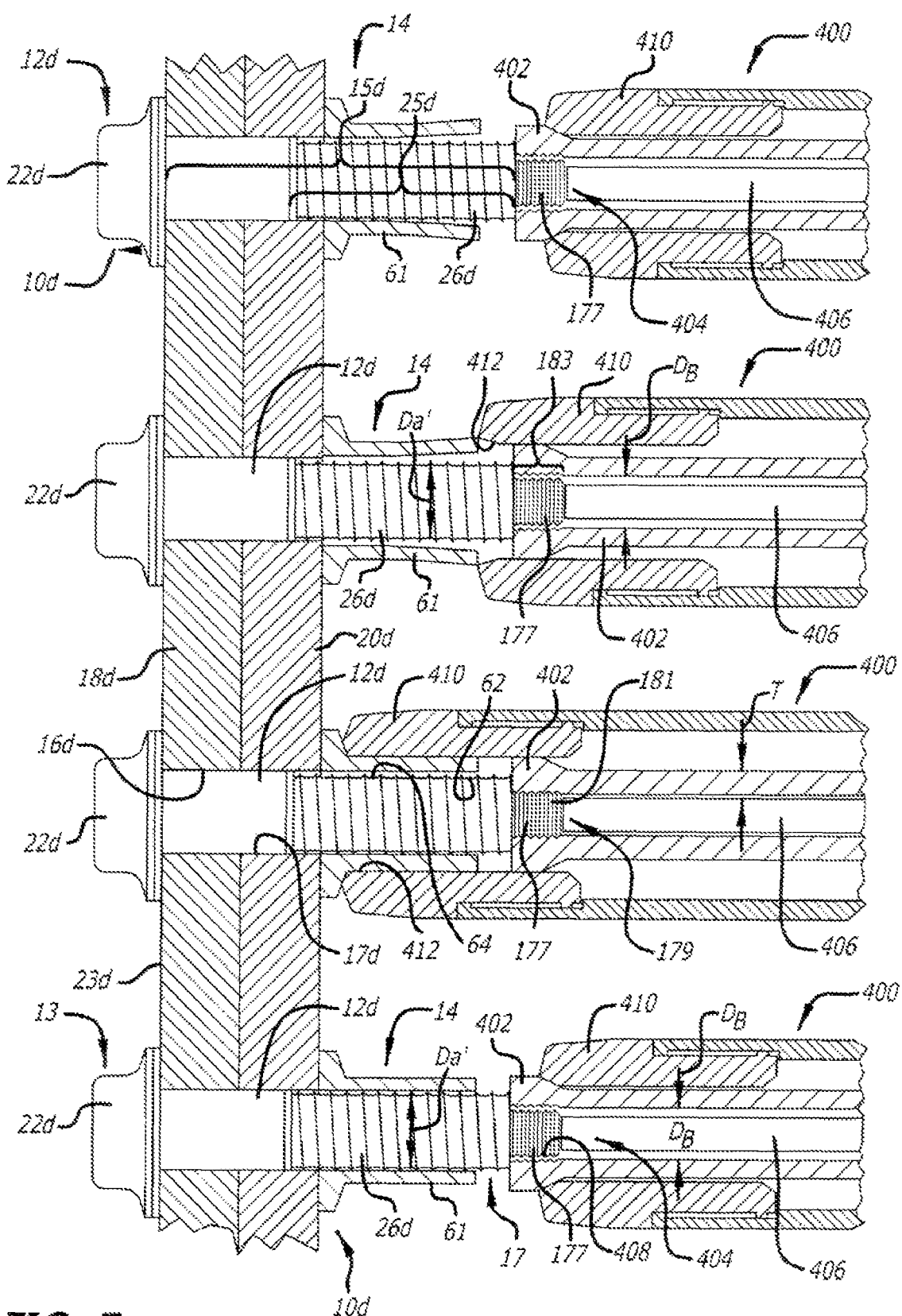
FIG. 7 is a cross-sectional view of an improved fastener pin pull portion and installation tool configuration in accordance with an embodiment of the invention and four sequential installation steps for swaging the fastener collar employing the improved pin pull portion.
Figure 9B:
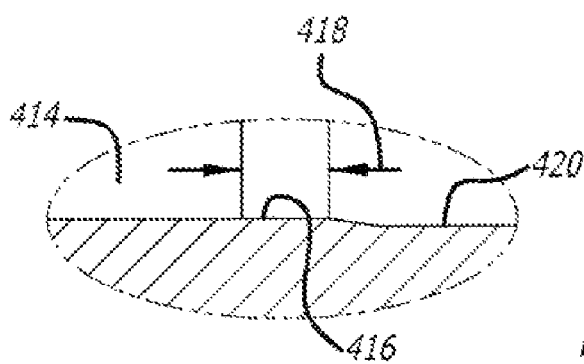

FIGS. 7, 8 and 9 show still further mechanisms for lowering swage loads and. thus increasing installation tool life, in accordance with the invention. Like the hybrid thread form 26d and as-headed collar 14 previously discussed, the following low swage load mechanisms can also be employed independently or in any suitable combination with one or both of the aforementioned hybrid thread form 26d (FIG. 6C) and as-headed collar 14 (FIGS. 1-3, 5, 6A, 6B and 6C).

FIG. 7 shows a fastener 10d and installation tool 400 for securing two workpieces 18d, 20d together wherein the fastener has a pull mechanism 177 comprising a substantially straight, relatively short pull portion 179 at the second end 19 of the pin 12d. Additionally, four sequential steps are shown for installing the fastener 10d using the exemplary low swage load system 50 in accordance with a method of the invention.

The pull section 179 of the pin 12d has a relatively short length 183 and thus extends or protrudes from the second end 19 of the pin 12d a short distance. In fact, the protrusion length 183 of the exemplary pull section is so short that, unlike the acorn-shaped pull section of U.S. Pat. No. 4,299, 519 (see, e.g., FIGS. 1-5) which has been incorporated by reference herein, the pull section 179 of the invention is not intended to be severed following installation, although severance of the pull section 179 is conceivable by using a breakneck groove on the pin 12d or shaving off the pull section 179 with a sharing tool in other embodiments of the invention (not shown). This advantageously eliminates shock loading of the installation tooling 400 known to be caused by the sudden fracture of a break neck groove (see, e.g., break neck groove 40 of. FIG. 1). It also eliminates pintail debris, and pinbreak noise. The preferred embodiment of the acorn-shaped pull portion of the '519 patent suffers from these disadvantages. More specifically, by way of example, for a ⅝ inch Grade 8 fastener 10d, the exemplary pull section 179 protrudes about 0.10 inches or less than the acorn-shaped pull section of the '519 patent. Also unlike the acorn-shaped pull section of the '519 patent, the exemplary pull section 179 extends substantially straight with all of the pull grooves 181 having substantially the same diameter $D_B$, which is smaller than the outer diameter $D_a$ of the locking portion 25d of the pin 12d, as shown. As will be discussed, the straight, reduced diameter $D_B$ configuration of the exemplary pull portion 179 promotes better engagement by the installation tool 400 and extended tool life. It is also significantly easier to manufacture than, for example, the tapered acorn-shaped configuration of the '519 patent, wherein each groove of the pull portion of the pull portion has a different diameter.

Other improvements of the fastening system 50 of the invention are also shown in FIGS. 7, 8 and 9. Specifically, the exemplary installation tool 400 for installing fastener 10d includes a collet 402 having a pull section 404 with a plurality of teeth 408 structured to complimentarily engage the grooves 181 of the pull portion 179 of the pin (e.g., pin 12d), and an anvil member 410 having a swage cavity 412 for swaging the collar 14, as previously discussed. The reduced diameter $D_B$ but generally straight configuration of the exemplary pull portion 179 allows the cross-sectional thickness T (FIGS. 7 and 8) of the collet 402 (FIGS. 7 and 8) to be increased. Specifically, the thickness T can be increased up to the full amount of the difference in diameters $D_a'$ and $D_B$ of the pin lock portion 25c and pull portion 179, respectively. This makes the installation tool 400 stronger, thus giving it a longer fatigue life. The exemplary reduced diameter pull portion 179 also results in less material being required for the manufacture of the pull portion 179 as compared, for example, with pull and locking portion 25a of fastener 10a of FIG. 2. This in turn allows for the pull grooves 181 of the exemplary pin pull section 179, and the corresponding teeth 408 of the installation tool pull section 404 to have a greater thickness, thereby reducing stripping and galling of the pull grooves 181. Stripping and galling of the pull threads are a longstanding known disadvantage in the art. The first few threads of the tapered acorn design of the '519 patent may be susceptible to stripping and galling as wherein those threads have a reduced diameter, and. thus reduced strength and resistance to stripping.

As noted, FIG. 7 also shows the general method of installation using the exemplary low swage load fastening system 50 of the invention. Specifically, as shown, in operation, once the pin 12d is inserted through aligned openings 16d, 17d in workpieces 18d, 20d, the collar 14 is applied over the second end 19 of the pin 12d. As previously discussed the collar may, but need not necessarily be the aforementioned exemplary as-headed collar 14. The pull portion 179 of the pin 12d is then engaged by collet 402 of the installation tool 400. The exemplary collet is a split gripper collet 402 which expands to an open position (FIG. 7, top illustration) and contracts to a constricted or closed position (FIG. 7, second illustration from the top) wherein the teeth 408 of the collet pull section 404 complimentarily substantially fully engage the pull grooves 181 of the pull portion 179. The installation tool 400 is then actuated thereby drawing the collet 402 into the swage anvil 410, and closing the pull section 404 of the collet 402, in order that the collet 402 pulls the pin 12d and collar 14 into the swage cavity 412 of the anvil 410 thereby applying a radially inward swage load. and swaging the collar 14 into the pin lock grooves 26d. The sensing rod 406 then detects when the swaging operation is complete by sensing when the pin 12d has been completely pulled, and accordingly deactivates the installation tool 400 withdrawing the collet 402, releasing the pull section 179, and ejecting the collar 14 from the anvil 410. Accordingly, the exemplary installation system 50 and method greatly improve and simplify fastener installation by achieving all of the advantages of a pintail-less installation while avoiding associated disadvantages like the required higher wear spin on thimble, which is replaced by the long wear collet 402. This also eliminates a plurality of other separate installation tool components such as a separate collet, release ejector, separate jaws, and follower and spring. and replaces them with essentially one part, the exemplary split gripper collet 402. In this manner the invention reduces the installation cycle time, cost, and complexity of know spin on engagements and provides tooling which is faster, lighter, quieter, and which contains less moving parts, equating to a significant cost savings.

It will be appreciated that other installation methods and configurations other than those shown and described herein, could be employed. For example, as previously discussed, it is conceivable that a severable pin pull section (not shown) or an inner drive pull mechanism configuration (not shown) could be employed without departing from the scope of the invention. It will also be appreciated that while the pull section 179 is shown as having annual pull grooves 181, other thread forms (e.g., without limitation, helical threads) could conceivably be employed if corresponding modifications were also made to the installation tool.

The improvements of the exemplary installation tool 400 afforded by the exemplary pin pull portion configuration are further appreciated with reference to FIGS. 8 and 9.

FIG. 8 shows part of the pull section 404 of the exemplary split gripper collet 402 for installation tool 400. The pull section 404 has an engagement end 405 (oriented to the left in FIG. 8) and a plurality of teeth 408. In the example of FIG. 8, the pull section 404 has four teeth 408. The first tooth 409, which is adjacent the engagement end 405 has a first inner diameter $ID_1$. The remainder of the teeth 408 have a second inner diameter $ID_2$, which is less than $ID_1$. By opening up the inner diameter, $ID_1$, of the first pulling tooth 409, as shown, the collet design of the invention resists chipping of that tooth 409.

Specifically, the vertex (shown in phantom line drawing in FIG. 8) of the exemplary first tooth 409 is removed to open up the inner diameter, $ID_1$, at that location. This in turn moves the primary point of loading from this location to one that is further back within the pull section 404, (e.g., to the right with respect to FIG. 8), thereby reducing the moment loading on the furthest forward root radius r of tooth 409 and thus increasing fatigue life of the collet 402. More specifically, by way of example with reference to the first tooth height h in the example of FIG. 8, a reduction in tooth height of about 30% results in a dramatic increase in tool 400 fatigue life to about 24,000 installation cycles at about 12,000 pounds swage pressure for a Grade 5 fastener, having the exemplary pull section 179 (FIG. 7), whereas the front tooth 409 previously failed at 14,000 cycles. This dramatic improvement resulted, as previously discussed, from reducing the movement arm on the front tooth 409 by increasing the $1D_1$, which shifted the failure mode back to a more robust area (e.g.; the fourth tooth 408 from the left) of the pull section 404 of the collet 402. This improvement is in addition to the aforementioned increase in tool life afforded by the greater wall thickness T of the collet 402. Additionally, as previously discussed, all of this is achieved through use of the exemplary single component split gripper collet 402, which is adapted to expand and constrict without requiring separate jaws, a separate ejector, or a separate follower and spring. This is because the exemplary split gripper collet 402 includes one or more slits (not shown) which make it constrictable from a relaxed or open position (top illustration of FIG. 7) to a closed or constricted position (second illustration of FIG. 7) by being drawn into the inner bore 420 (Figure e)) of the anvil 410 which exerts a radially inward force in order to close the collet pull section 404. It will, however, be appreciated that any known or suitable alternative collet design (not shown) having, for example, without limitation separate closeable jaws (not shown) could be employed to, for example, engage and pull the pin pull portion 179 (FIG. 7).

FIG. 9 shows yet another advancement of the exemplary low swage load fastening system 50.

Specifically, the exemplary swage anvil 410 includes the swage cavity 412, which. as shown, has a radiused entrance section 414 in order to facilitate initial engagement with the collar 14 (FIG. 7), a swage land 416, and an inner bore 420. The swage land 416 has a first diameter $D_1$, and the inner bore 420 has a second diameter $D_2$, which is greater than the first diameter $D_1$. Accordingly, the inner bore diameter $D_2$, which opens up behind the swage land 416, relieves compressive swage load on the collar 14 (FIG. 7). This is made possible by the relatively narrow (i.e., small) nature of the exemplary swage land 416 (best shown in the sectional close-up view of FIG. 9). The narrow width 418 of the swage land defines a small swaging area because it then opens into the larger diameter $D_2$ inner bore 120, as opposed to having a continuous single diameter for substantially the entire length L. of the swage anvil 410. The increased diameter, $D_2$, of the inner bore 420 of the exemplary anvil 410 also provides space to accommodate the thicker and thus stronger wall thickness T of the collet 402 (FIGS. 7 and 8), thereby further increasing tool life. Furthermore, the length L, of the improved anvil 410 of the invention, may also be shortened, as compared, for example, to anvil 110 of FIG. 1. Accordingly, the low swage load fastening system 50 of the invention also provides a number of installation tool 400 improvements by reducing the number parts for the tool, decreasing the weight of the tool, reducing swage loads required by the tool, reducing the cost to make the tool, and increasing the expected life time of the tool.

With reference particularly to FIGS. 6A, 6B and 6C, the details of the interaction of the collar and bolt are shown. When the collar first tries to the pull the bolt in preload, the collar is not strong enough, so the first bolt crest shears the collar, creating a void and rolling up collar material in front of the bolt crest. The same thing happens to a lesser extent on the second bolt crest. Finally, there is enough collar material engaged onto the bolt so voids and roll-up do not occur. This, happens sooner with as-headed collars that are harder than quench/tempered collars because they have higher shear strength. Harder collars stretch the bolt sooner and create more preload.

FIG. 10 is a cross-sectional view of an improved fastener pin pull portion and installation tool configuration in accordance with an embodiment of the invention and four sequential installation steps for swaging the fastener collar employing the improved pin pull portion using a different collet. The system there shown is similar to FIG. 7. In FIG. 11, which is similar to FIG. 8 there is a cross-sectional view of an end portion of the different collet for the installation tool of FIG. 10.

In the disclosure of FIGS. 10 and 11 there is a low swage load fastening system for a swage-type fastener structured to secure a plurality of workpieces together. The swage-type fastener includes a pin member having an elongated pin shank adapted to be located in aligned openings in the workpieces. The pin member terminates at one end in an enlarged head adapted to engage a surface on one side of the workpieces and at its opposite end in a grooved portion adapted to extend past an opposite surface on the opposite side of the workpieces.

The grooved portion comprises a locking portion having a plurality of lock grooves defined by circumferentially extending pin grooves and associated pin shoulders terminating in pin crests.

An installation tool includes an anvil member 410 with a swage cavity. There is an as-headed collar 14 including a generally straight collar shank adapted to be swaged into said lock grooves on the pin member in response to a relative axial force or swage load applied between the pin member and the as-headed collar by the installation tool.

A desired magnitude of clamp load on the workpieces which are fastened together define a fastened joint. The swage cavity of said installation tool is structured to engage said collar shank and to swage it radially inward. The as-headed collar when swaged, has collar grooves and shoulders interlocking said pin grooves and shoulders. The pin member and said as-headed collar is of different materials having ultimate shear stresses of different magnitudes in order that yielding of said pin member is substantially avoided upon swaging said collar to said pin member.

The collet 600 has a protrusion 602 from said collet thereby extending the length 604 of the pull section in a direction towards the collar 14 thereby to increase the contact area with the anvil 410. Extending puller length increases contact area with anvil which decreases pressure and galling. It also allows for lead angle as puller returns through smaller anvil bore.

The as-headed collar does not require thermal processing, and the generally straight collar shank of the as-headed collar has a wall thickness which is relatively thin thereby reducing the swage load required to the as-headed collar.

The protrusion 600 forms a flat circular face 600 ahead of and adjacent to the leading thread 608 of the collet 600. Then there is a circular forwardly angled face 610 ahead of the flat face 606. There is a second flat face 612, and an angular flat face 614 back to a line of intersection 616 with the outer diameter of the collet 600. The shear strength of the last bolt crest is increased by not rolling down the headed blank diameter at the end of the bolt.

The end 618 of the pull 620 is not rolled down to a diameter position in line with the base 622 of the groove 624. This increases the shear strength of the end pull crest 626 of the pull 620. The puller teeth shears bolt threads off at line 636.

The last pull crest 626 of the pull has a contour 628 to conform with an enlarged puller radius 630 of the last tooth 620 of the collet 600.

Also, the shortened first puller tooth 632 increasing its thickness 634 thus reduces chipping.

In view of the foregoing, the invention provides a low swage load fastening system and method with numerous improved fastener and installation tool features, including an as-headed collar, a hybrid lock groove thread farm, an improved pin pull section, and a variety of installation tool improvements, all of which independently, and in any suitable combination, lower swage loads and improve the installation of swage-type fasteners.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A fastener, comprising:

a pin member having an elongated pin shank adapted to be located in aligned openings in a plurality of workpieces, the pin member terminating at one end in a head that is adapted to engage a surface on one side of the workpieces and at its opposite end in a grooved portion that is adapted to extend past an opposite surface on an opposite side of the workpieces, the grooved portion including a locking portion having a plurality of lock grooves defined by circumferentially extending pin grooves and associated pin shoulders terminating in pin crests; and an as-headed collar including a generally straight collar shank that is adapted to be swaged into the lock grooves of the pin member in response to a swage load applied between the pin member and the as-headed collar, thereby providing a desired magnitude of clamp load on the workpieces, the as-headed collar, when swaged, having collar grooves and collar shoulders that interlock with the pin grooves and the pin shoulders, wherein the pin member and the as-headed collar include ultimate shear stresses of different magnitudes in order that yielding of the pin member is substantially avoided upon swaging the collar to the pin member, wherein the as-headed collar does not require thermal processing, and the collar shank of the as-headed collar has a wall thickness which is relatively thin, thereby reducing the swage load required to swage the as-headed collar, and wherein the as-headed collar has an outer diameter and an inner diameter, and wherein the ratio of the outer diameter to the inner diameter of the as-headed collar is between about 1.47 to 1.55.

2. The fastener of claim 1, wherein the wall thickness of the collar shank of the as-headed collar is adapted to resist overpacking of the lock grooves of the pin member, thereby further reducing the swage load required to swage the as-headed collar.

3. The fastener of claim 1, wherein the collar exhibits physical properties sufficient to qualify for a fastener Grade selected from the group consisting of Grade 5 and Grade 8.

4. The fastener of claim 3, wherein the hardness of the as-headed collar is between about 85 Rb to 95 Rb.

5. The fastener of claim 1, wherein the as-headed collar is made from unannealed low carbon steel.

6. The fastener of claim 1, wherein the as-headed collar is made from annealed low carbon steel.

7. The fastener of claim 1, wherein the collar includes an enlarged flange at one end of the collar shank, the enlarged flange being adapted to engage a confronting surface on an adjacent one of the workpieces.

8. The fastener of claim 1, further comprising an assembly tab adapted to engage the lock grooves of the pin member in order to hold the fastener in an assembled position with a predetermined preload before the as-headed collar is swaged.

9. A fastener, comprising:

a pin member having an elongated pin shank adapted to be located in aligned openings in a plurality of workpieces and terminating at a first end in a head which engages a surface on one side of the workpieces and at a second end in a grooved portion which extends past an opposite surface on an opposite side of the workpieces, the grooved portion including a locking portion having a plurality of lock grooves defined by circumferentially extending pin grooves and associated pin shoulders terminating in pin crests, the locking portion of the pin member having an outer diameter;

a substantially straight pull portion extending from the second end of the pin member and including a plurality of pull grooves, the pull portion having an outer diameter which is smaller than the outer diameter of the locking portion of the pin member; and a collar including a generally straight collar shank adapted to be swaged into the lock grooves of the pin member in response to a relative axial pulling force applied to the pull portion of the pin member, thereby providing a desired magnitude of clamp load on the workpieces, the collar, when swaged, having collar grooves and collar shoulders that interlock with the pin grooves and the pin shoulders, the pin member and the collar having ultimate shear stresses of different magnitudes in order that yielding of the pin member is substantially avoided upon swaging the collar thereto, wherein the pull portion of the pin member has a length that is less than the length of the locking portion of the pin member in order that a protrusion length of the pull portion from the second end of the pin member is relatively short, and wherein the pull portion is adapted to remain on the second end of the pin member after the installation of the fastener.

10. The fastener of claim 9, wherein all of the pull grooves of the pull portion of the pin member have substantially the same diameter.

11. A fastener, comprising:

a pin member having an elongated pin shank adapted to be located in aligned openings in a plurality of workpieces and terminating at a first end in a head which engages a surface on one side of the workpieces and at a second end in a grooved portion which extends past an opposite surface on an opposite side of the workpieces, the grooved portion comprising a locking portion having a plurality of lock grooves defined by circumferentially extending pin grooves and associated pin shoulders terminating in pin crests, the locking portion of the pin member having a outer diameter; and a collar including a generally straight collar shank adapted to be swaged into the lock grooves of the pin member in response to a swage load applied between the pin member and the collar, thereby providing a desired magnitude of clamp load on the workpieces, the collar, when swaged, having collar grooves and collar shoulders that interlock with the pin grooves and the pin shoulders, wherein the pin member and the collar have ultimate shear stresses of different magnitudes in order that yielding of the pin member is substantially avoided upon swaging the collar thereto, wherein the lock grooves of the pin member comprise a thread form defined by a number of radii for each of the pin grooves, the pin shoulders, and the pin crests of the lock grooves, the radii being blended in order to have a substantially smooth transition between the radii and thereby promote the complimentary interlocking engagement of the collar grooves with the lock grooves when the collar is swaged and to reduce the swage load required to swage the collar, and wherein each of the lock grooves has a pitch length and a depth, and wherein the ratio of the pitch length to the depth is between about 2.5 to 4.

12. The fastener of claim 11, wherein the crests of each pin groove include a first crest and a second crest; wherein the distance between the first and second crests defines the pitch of the lock grooves; wherein the radii includes first, second, third and fourth radii; and wherein the second radius and the third radius define the bottom portion of the pin groove, the first, second, third, and fourth radii being blended to provide the substantially smooth transition therebetween.

13. The fastener of claim 12 wherein the thread form defined by the blended radii is selected from the group consisting of an annular thread form, and a helical thread form, and a wave thread form.

14. The fastener of claim 11, wherein the ratio of the shear strength between the pin member and the collar is between about 1.5 to 2.1.

15. A fastener, comprising:
a pin member having an elongated pin shank adapted to be located in aligned openings in a plurality of workpieces, the pin member terminating at one end in a head that is adapted to engage a surface on one side of the workpieces and at its opposite end in a grooved portion that is adapted to extend past an opposite surface on an opposite side of the workpieces, the grooved portion including a locking portion having a plurality of lock grooves defined by circumferentially extending pin grooves and associated pin shoulders terminating in pin crests; and
an as-headed collar including a generally straight collar shank that is adapted to be swaged into the lock grooves of the pin member in response to a swage load applied between the pin member and the as-headed collar, thereby providing a desired magnitude of clamp load on the workpieces, the as-headed collar, when swaged, having collar grooves and collar shoulders that interlock with the pin grooves and the pin shoulders,
wherein the pin member and the as-headed collar include ultimate shear stresses of different magnitudes in order that yielding of the pin member is substantially avoided upon swaging the collar to the pin member,
wherein the as-headed collar does not require thermal processing, and the collar shank of the as-headed collar has a wall thickness which is relatively thin, thereby reducing the swage load required to swage the as-headed collar,
and wherein the hardness of the as-headed collar is between about 85 Rb to 95 Rb.

16. A fastener, comprising:
a pin member having an elongated pin shank adapted to be located in aligned openings in a plurality of workpieces, the pin member terminating at one end in a head adapted to engage a surface on one side of the workpieces and at its opposite end in a grooved portion adapted to extend past an opposite surface on an opposite side of the workpieces, the grooved portion comprising a locking portion having a plurality of lock grooves defined by circumferentially extending pin grooves and associated pin shoulders terminating in pin crests;
a substantially straight pull portion extending from the opposite end of the pin member and including a plurality of pull grooves; and
an as-headed collar including a generally straight collar shank adapted to be swaged into the lock grooves on the pin member in response to a swage load applied between the pin member and the as-headed collar, thereby providing a desired magnitude of clamp load on the workpieces, the as-headed collar, when swaged, having collar grooves and collar shoulders that interlock with the pin grooves and the pin shoulders,
the pin member and the as-headed collar having ultimate shear stresses of different magnitudes in order that yielding of the pin member is substantially avoided upon swaging the collar to the pin member,
wherein an end of the pull portion is not rolled down to a diameter position in line with a base of the pull grooves of the pull portion thereby to increase the shear strength of an end pull crest of the pull portion,
and wherein the as-headed collar does not require thermal processing, and the generally straight collar shank of the as-headed collar has a wall thickness which is relatively thin thereby reducing the swage load required to the as-headed collar.

* * * * *